(12) United States Patent
Ikeda et al.

(10) Patent No.: US 8,639,222 B2
(45) Date of Patent: Jan. 28, 2014

(54) MESSAGE TRANSMISSION METHOD AND MESSAGE TRANSMISSION SYSTEM

(75) Inventors: Tomohiro Ikeda, Osaka (JP); Yuuji Nanba, Osaka (JP); Shuichi Enomoto, Osaka (JP); Tooru Natsumi, Osaka (JP); Hiroyuki Tanaka, Osaka (JP); Yukio Kise, Osaka (JP); Hideo Shirai, Osaka (JP); Minao Tanaka, Osaka (JP); Naoto Matsuo, Osaka (JP); Takashi Nagata, Osaka (JP); Shigehiro Takeuchi, Osaka (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/572,783

(22) Filed: Oct. 2, 2009

(65) Prior Publication Data

US 2010/0087170 A1  Apr. 8, 2010

(30) Foreign Application Priority Data

Oct. 7, 2008 (JP) .................................. 2008-260626

(51) Int. Cl.
*H04L 12/58* (2006.01)

(52) U.S. Cl.
USPC ................ 455/412.1; 455/414.1; 455/412.2; 455/413; 455/414.2; 455/414.4; 455/466

(58) Field of Classification Search
USPC ................ 455/412.1, 412.2, 466, 413, 414.1, 455/414.4
See application file for complete search history.

(56) References Cited

U.S. PATENT DOCUMENTS

| | | |
|---|---|---|
| 5,758,280 A | 5/1998 | Kimura |
| 2005/0144246 A1* | 6/2005 | Malik ........................... 709/206 |
| 2005/0221802 A1* | 10/2005 | Hosono ....................... 455/412.1 |
| 2007/0198253 A1* | 8/2007 | Luehrig et al. ................ 704/221 |
| 2007/0202896 A1* | 8/2007 | Contreras Alvarez et al. ............................. 455/466 |

FOREIGN PATENT DOCUMENTS

| | | |
|---|---|---|
| JP | H09-84140 | 3/1997 |
| JP | 2003-115928 A | 4/2003 |
| JP | 2005-64609 A | 3/2005 |
| JP | 2005-311889 A | 11/2005 |
| JP | 2006-237751 | 9/2006 |
| JP | 2008-092367 A | 4/2008 |

OTHER PUBLICATIONS

Japanese Office Action mailed Jan. 8, 2013 for corresponding Japanese Application No. 2008-260626, with Partial English-language Translation.
Japanese Office Action mailed on May 14, 2013 for corresponding Japanese Application No. 2008-260626, with partial English-language translation.
Japanese Office Action mailed Oct. 15, 2013 for corresponding Japanese Application No. 2008-260626, with partial English-language translation.

* cited by examiner

*Primary Examiner* — Khalid Shaheed
(74) *Attorney, Agent, or Firm* — Fujitsu Patent Center

(57) ABSTRACT

A message transmission method includes storing message data whose message contents change depending on a value of a parameter in a storage unit, acquiring the value of the parameter based on an operation of a called party when a second terminal device receives a call from a first terminal device, determining the contents of the message based on the acquired parameter value and the message data, and transmitting the message whose contents are determined to the first terminal device.

5 Claims, 33 Drawing Sheets

FIG. 8

TLA

| TEMPLATE ID | TEXT DATA | |
|---|---|---|
| 11 | I'M CURRENTLY IN A MEETING. I'LL CALL YOU BACK IN X HOURS. | DTA |
| 12 | I'M CURRENTLY IN A MEETING. I'LL CALL YOU BACK TOMORROW. | DTA |
| 13 | I'M CURRENTLY IN A MEETING. PLEASE CALL ME BACK SOMETIME LATER. | DTA |
| 21 | I'M CURRENTLY DRIVING. I'LL CALL YOU BACK IN X HOURS. | DTA |
| 22 | I'M CURRENTLY DRIVING. I'LL CALL YOU BACK TOMORROW. | DTA |
| 23 | I'M CURRENTLY DRIVING. PLEASE CALL ME BACK SOMETIME LATER. | DTA |
| 31 | I'M CURRENTLY ON A TRAIN. I'LL CALL YOU BACK IN X HOURS. | DTA |
| 32 | I'M CURRENTLY IN A HOSPITAL. I'LL CALL YOU BACK WHEN I'M OUT OF THE HOSPITAL. | DTA |
| 33 | I'M CURRENTLY WORKING. I'LL CALL YOU BACK AFTER WORK. | DTA |

FIG. 9

TLB

PHONE NUMBER : 090-XXXX-1234

| GUIDANCE ID | TEMPLATE ID | PARAMETER (X) |   |
|---|---|---|---|
| 0 | 11 | 1 | ~ DTB |
| 1 | 12 |   | ~ DTB |
| 2 | 13 |   | ~ DTB |
| 3 | 11 | 2 | ~ DTB |
| 4 | 21 | 3 | ~ DTB |
| 5 | 22 |   | ~ DTB |
| 6 | 23 |   | ~ DTB |
| 7 | 31 | 2 | ~ DTB |
| 8 | 32 |   | ~ DTB |
| 9 | 33 |   | ~ DTB |

| PHONE NUMBER OF CALLING PARTY | PHONE NUMBER OF CALLED PARTY | CALLBACK TIME | |
|---|---|---|---|
| 090-xxxx-0123 | 090-yyyy-9999 | 9:20 | ~ DTC |
| 090-aaaa-1234 | 080-bbbb-8888 | 10:15 | ~ DTC |
| 090-cccc-1111 | 090-dddd-7777 | 8:26 | ~ DTC |
| 090-eeee-2468 | 090-gggg-9876 | 13:30 | ~ DTC |
| ⋮ | ⋮ | ⋮ | |

MESSAGE TRANSMISSION METHOD AND MESSAGE TRANSMISSION SYSTEM

CROSS-REFERENCE TO RELATED APPLICATIONS

This application is based upon and claims the benefit of priority of the prior Japanese Patent Application No. 2008-260626, filed on Oct. 7, 2008, the entire contents of which are incorporated herein by reference.

FIELD

The disclosed method and system relate to a method and a system for transmitting a message to a calling party when a called party cannot answer a call for a reason that the called party is in a meeting, driving a car, or the like.

BACKGROUND

At present, there is provided a service which is widely used for transmitting a called party's preliminarily prepared message to a calling party or recording a message from the calling party when the called party cannot answer an incoming call.

Further, Japanese Patent Laid-Open No. 09-84140 discloses the following method. A plurality of messages is preliminarily stored in a mobile phone. When a call is received, the called party's mobile phone detects and displays the calling source, and further displays the plurality of messages stored. The called party confirms the calling source and selects a message suitable for the calling source. Then, the mobile phone transmits the selected message to the calling source.

SUMMARY

According to an aspect of the embodiment, a message transmission method includes storing message data whose message contents change depending on a value of a parameter in a storage unit, acquiring the value of the parameter based on an operation of a called party when a second terminal device receives a call from a first terminal device, determining the contents of the message based on the acquired parameter value and the message data, and transmitting the message whose contents are determined to the first terminal device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 illustrates an example of a template table;

FIG. 9 illustrates an example of a guidance table;

FIG. 17 illustrates an example of callback time data stored in a callback time data storage section;

DESCRIPTION OF EMBODIMENTS

The message transmission method and system can transmit only the preliminarily prepared messages to the calling party (calling source). Therefore, the message transmission method and system cannot flexibly transmit a message appropriate to a particular circumstance of the called party.

In view of the above problems, the message transmission method and system of the present invention have been considered, and an object of the present invention is to allow a calling party to receive a message more flexibly adapted to a circumstance of the called party than before.

The message transmission method of the present invention is used when a called party, who is a user of a second terminal device, cannot answer a call from a first terminal device. The message transmission method of the present invention preliminarily stores, in a storage unit, message data of messages whose contents change according to a parameter value. When the second terminal device receives a call from the first terminal device, the message transmission method of the present invention executes a parameter value acquisition process of acquiring a value of the parameter based on an operation of the called party. Further, the message transmission method of the present invention executes a contents determination process of determining the contents of the message based on the parameter value and the message data acquired by the parameter value acquisition process, and executes a message transmission process of transmitting the message whose contents are determined to the first terminal device.

It is preferable that the second terminal device executes a parameter value transmission process of transmitting the acquired parameter value to a server, and the server executes the contents determination process.

Alternatively, the second terminal device executes the parameter value acquisition process during the time period from receiving the call to responding to the call.

The present invention allows a calling party to receive a message more flexibly adapted to a circumstance of the called party.

First Embodiment

Figure 1:
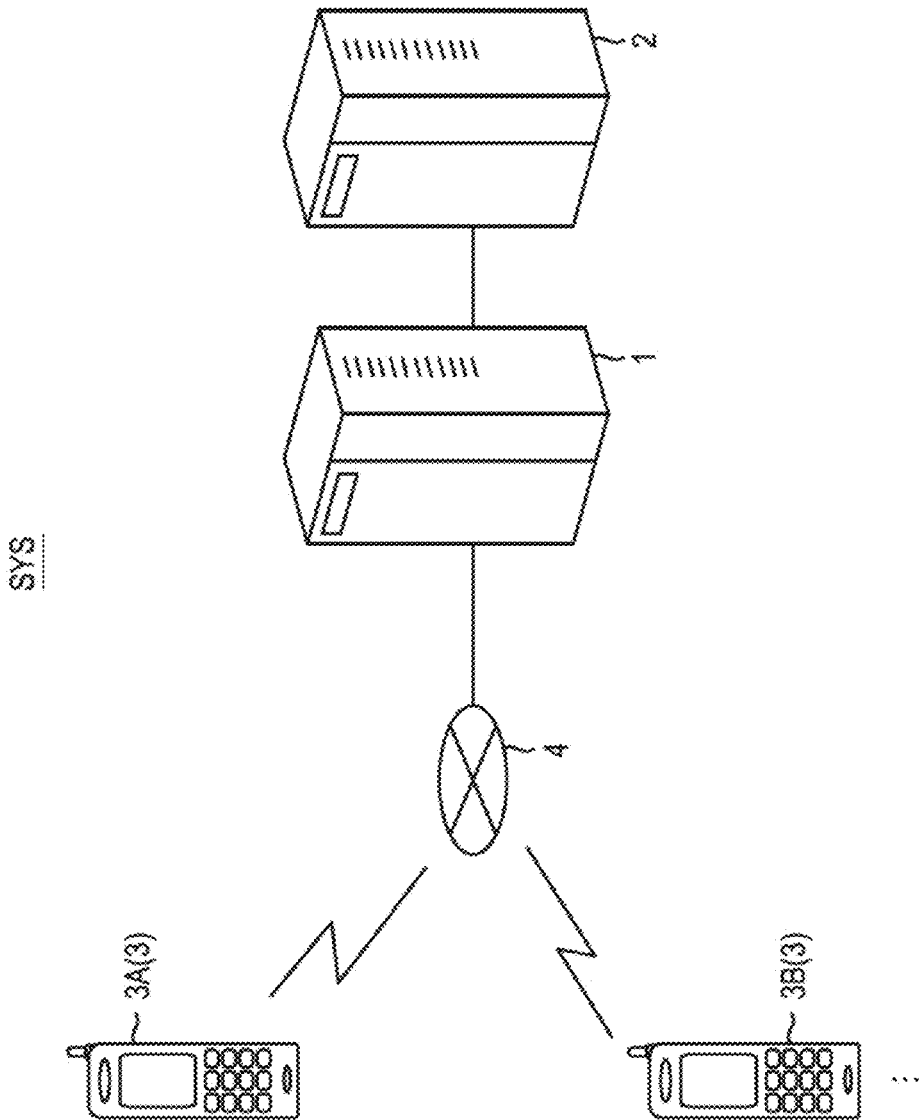
FIG. 1 illustrates an example of an entire configuration of a mobile phone communication system.
Figure 2:
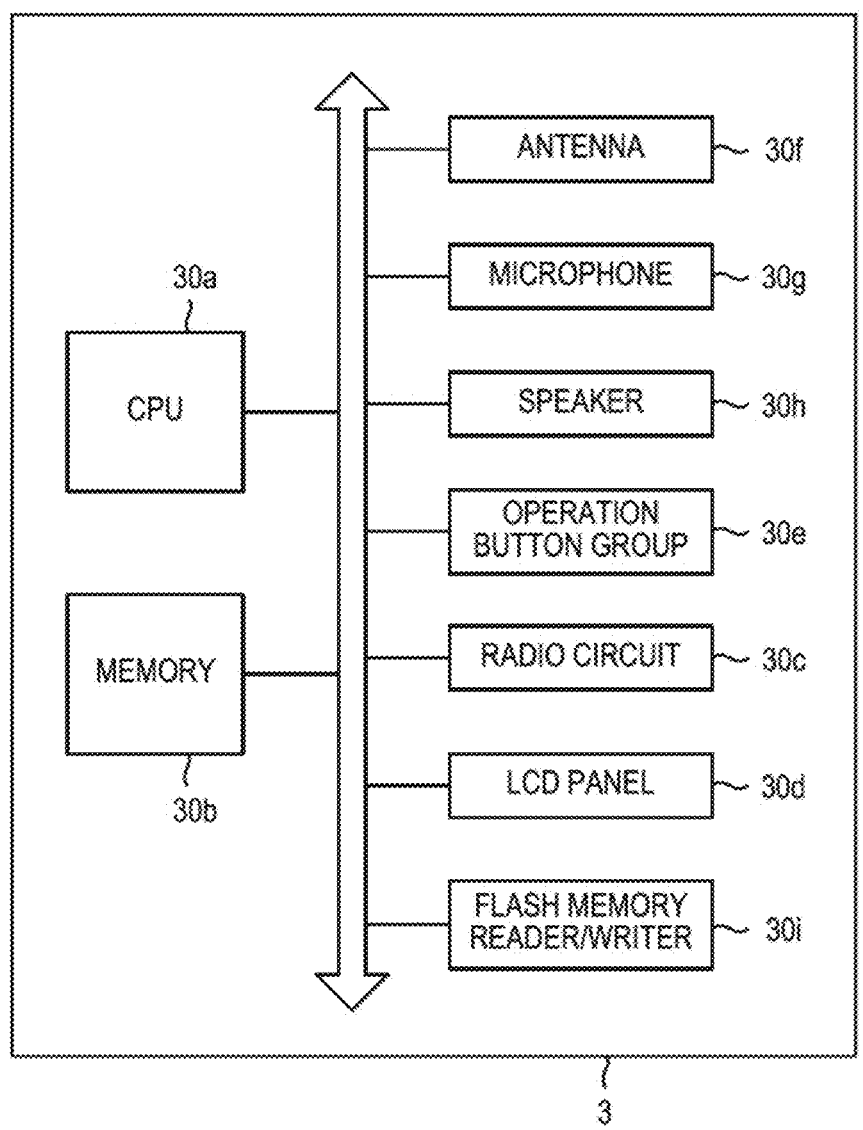
FIG. 2 illustrates an example of a hardware configuration of a mobile phone terminal.
Figure 3:
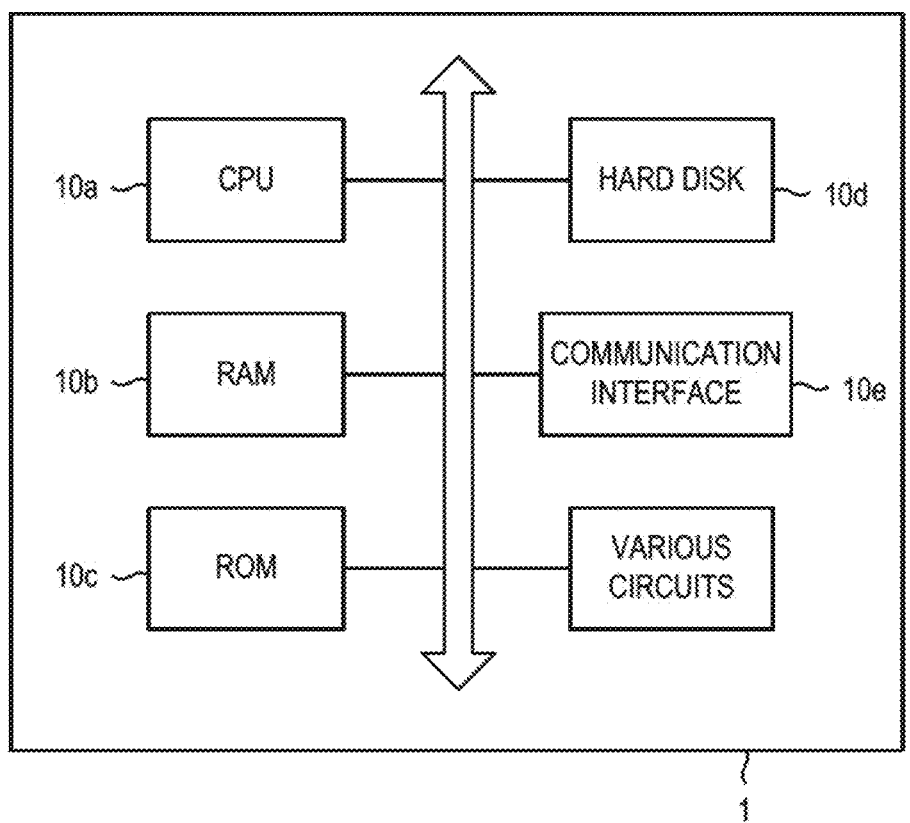
FIG. 3 illustrates an example of a hardware configuration of a call control server.
Figure 4:
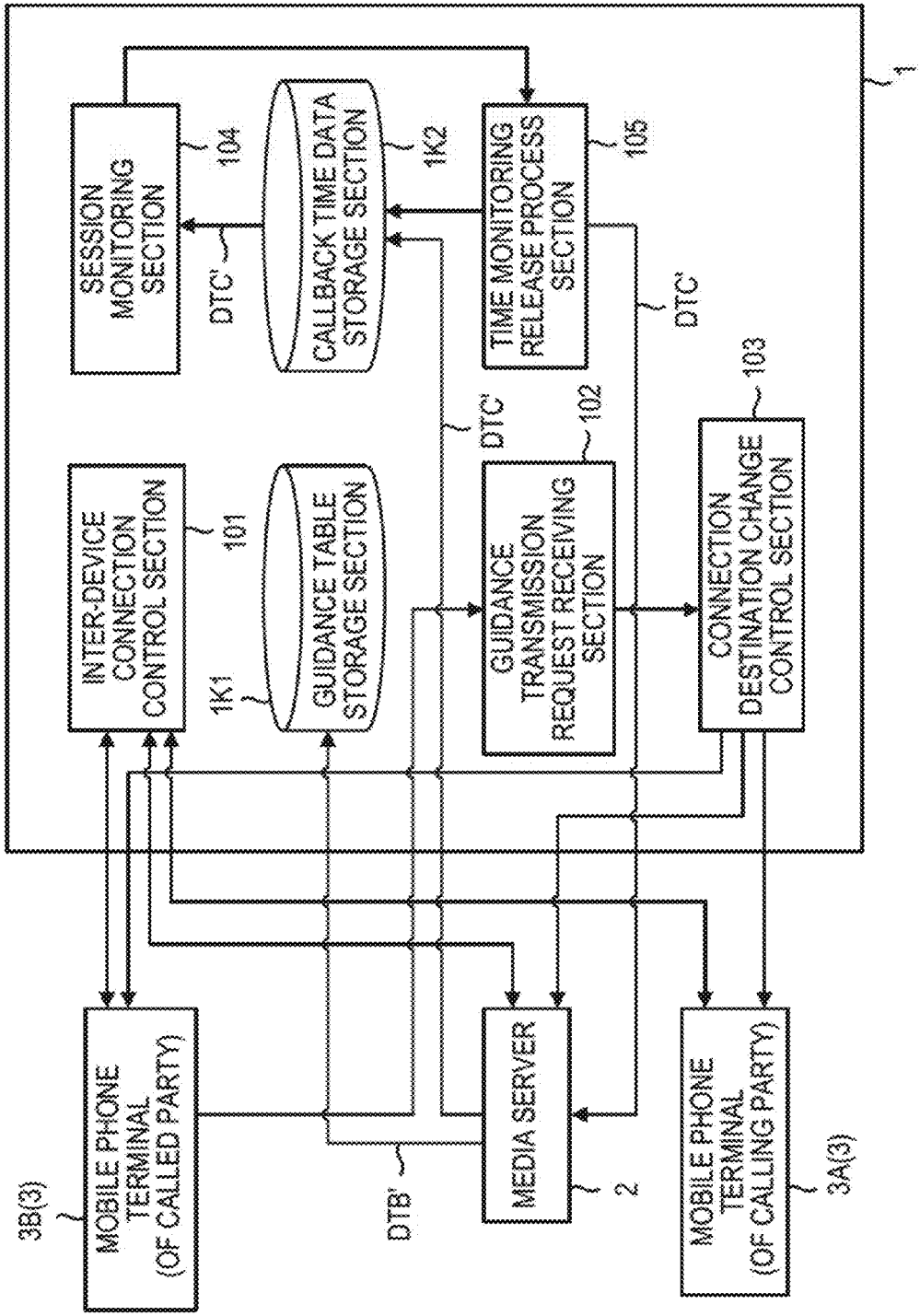
FIG. 4 illustrates an example of a functional configuration of the call control server.
Figure 5:
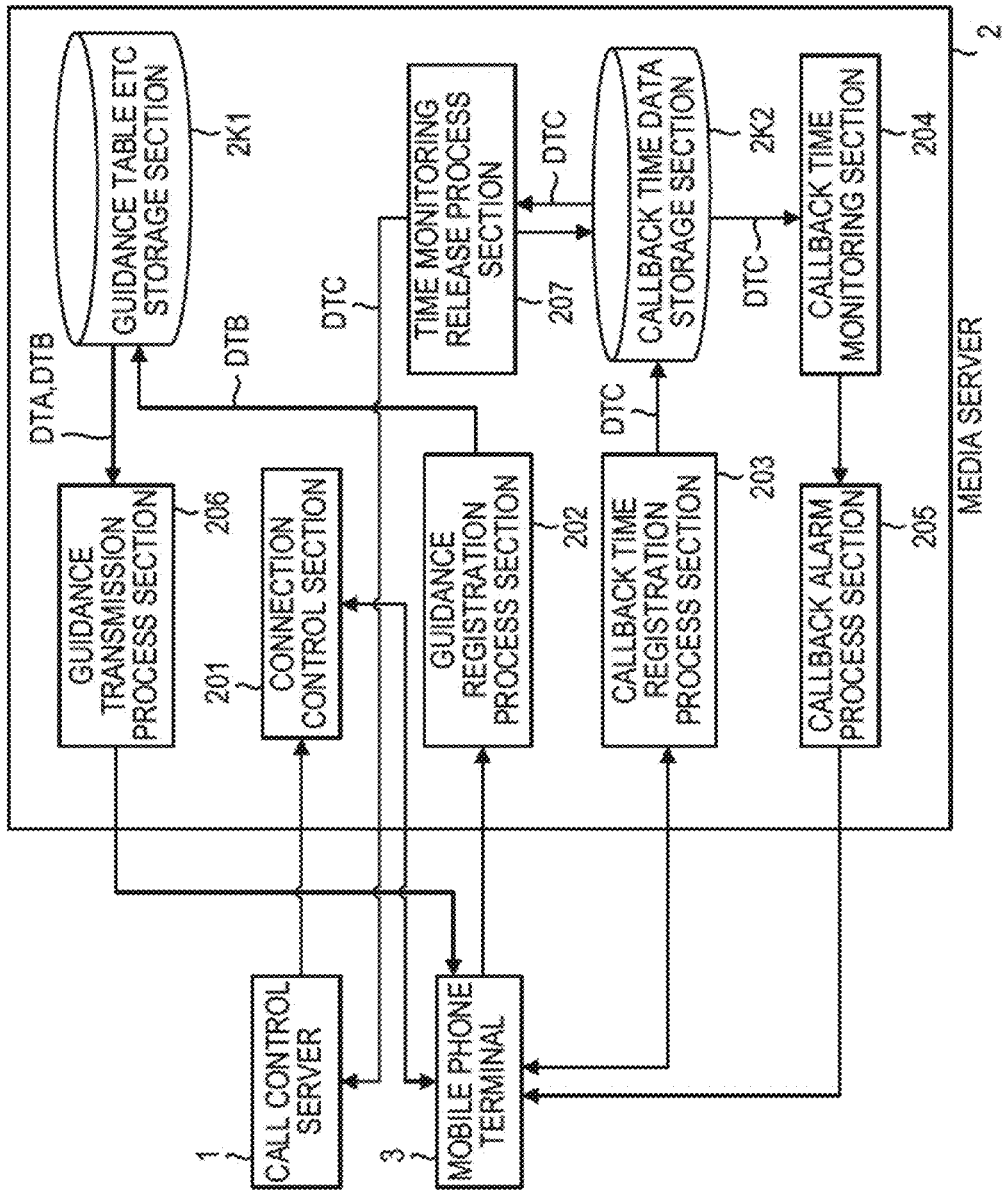
FIG. 5 illustrates an example of a functional configuration of a media server.

FIG. 1 illustrates an example of an entire configuration of a mobile phone communication system SYS; FIG. 2 illustrates an example of a hardware configuration of a mobile phone terminal 3; FIG. 3 illustrates an example of a hardware configuration of a call control server 1; FIG. 4 illustrates an example of a functional configuration of the call control server 1; and FIG. 5 illustrates an example of a functional configuration of a media server 2.

As illustrated in FIG. 1, the mobile phone communication system SYS is a system allowing each subscriber subscribing to a mobile phone communication service to talk to each other or exchange electronic data with each other, and includes a call control server 1, a media server 2, mobile phone terminals 3, and a radio access network 4.

The radio access network 4 is a network connecting the subscriber's mobile phone terminals 3 to each other and may include a base station, a base station controller, and the like.

The mobile phone terminal 3 is a mobile phone terminal used by a subscriber, and as illustrated in FIG. 2, includes a CPU (Central Processing Unit) 30a, a memory 30b, a radio circuit 30c, an LCD panel 30d, an operation button group 30e, an antenna 30f, a microphone 30g, a speaker 30h, and a flash memory reader/writer 30i. As described above, the hardware configuration of the mobile phone terminal 3 is basically the same as the hardware configuration of a conventional mobile phone terminal.

The software stored in the memory 30b is basically the same as conventional software. Examples of the software stored in the memory 30b include a firmware, an operating system, a mailer, a browser, address book management software, and the like.

These programs are executed by the CPU 30a as needed. A part of these software functions may be executed only by the hardware such as a dedicated circuit. Hereinafter, each mobile phone terminal 3 may be written separately as "a mobile phone terminal 3A", "a mobile phone terminal 3B", and the like.

The call control server 1 uses a protocol such as a SIP (Session Initiation Protocol) to control a call from a mobile phone terminal 3 to another mobile phone terminal 3 or the media server 2 and to connect both terminals to each other. As illustrated in FIG. 3, the call control server 1 includes a CPU 10a, a RAM (Random Access Memory) 10b, a ROM (Read Only Memory) 10c, a hard disk 10d, a communication interface 10e, and other various circuits.

As illustrated in FIG. 4, the ROM 10c or the hard disk 10d stores programs and data for implementing the functions such as an inter-device connection control section 101, a guidance transmission request receiving section 102, a connection destination change control section 103, a session monitoring section 104, a time monitoring release process section 105, a guidance table storage section 1K1, and a callback time data storage section 1K2. These programs and data are loaded in the RAM 10b as needed and the programs are executed by the CPU 10a. A part or all of these functions may be implemented only by the hardware such as a dedicated circuit.

The media server 2 performs a process of transmitting pre-registered guidance with a voice to a calling user from a called user who cannot answer the call. Further, when a certain time has elapsed, the media server 2 performs a process of prompting the user who cannot answer the call to make a return call (callback).

Like the call control server 1, the media server 2 also includes a CPU, a RAM, a ROM, a hard disk, a communication interface, and the like. Note that as illustrated in FIG. 5, the ROM and the hard disk store programs and data for implementing the functions such as a connection control section 201, a guidance registration process section 202, a callback time registration process section 203, a callback time monitoring section 204, a callback alarm process section 205, a guidance transmission process section 206, a time monitoring release process section 207, a guidance table etc storage section 2K1, and a callback time data storage section 2K2. These programs and data are loaded in the RAM as needed and the programs are executed by the CPU. A part or all of these functions may be implemented only by the hardware such as a dedicated circuit.

In addition, the mobile phone communication system SYS includes a gateway mobile switching center, a home location register, and the like, and may be connected to the Internet and other carrier communication networks.

Hereinafter, each section of the call control server 1 illustrated in FIG. 4, each section of the media server 2 illustrated in FIG. 5, and the contents of each process of the mobile phone terminal 3 will be described under the headings: "Basic processes and guidance registration process", "Guidance output in an unrespondable time and callback time registration process", "Process for prompting the user for a callback", "Process in a case where two parties start talking without waiting for a callback alarm", and "Process in a case where the calling party no longer needs a callback".

[Basic Processes and Guidance Registration Process]

Figure 6:
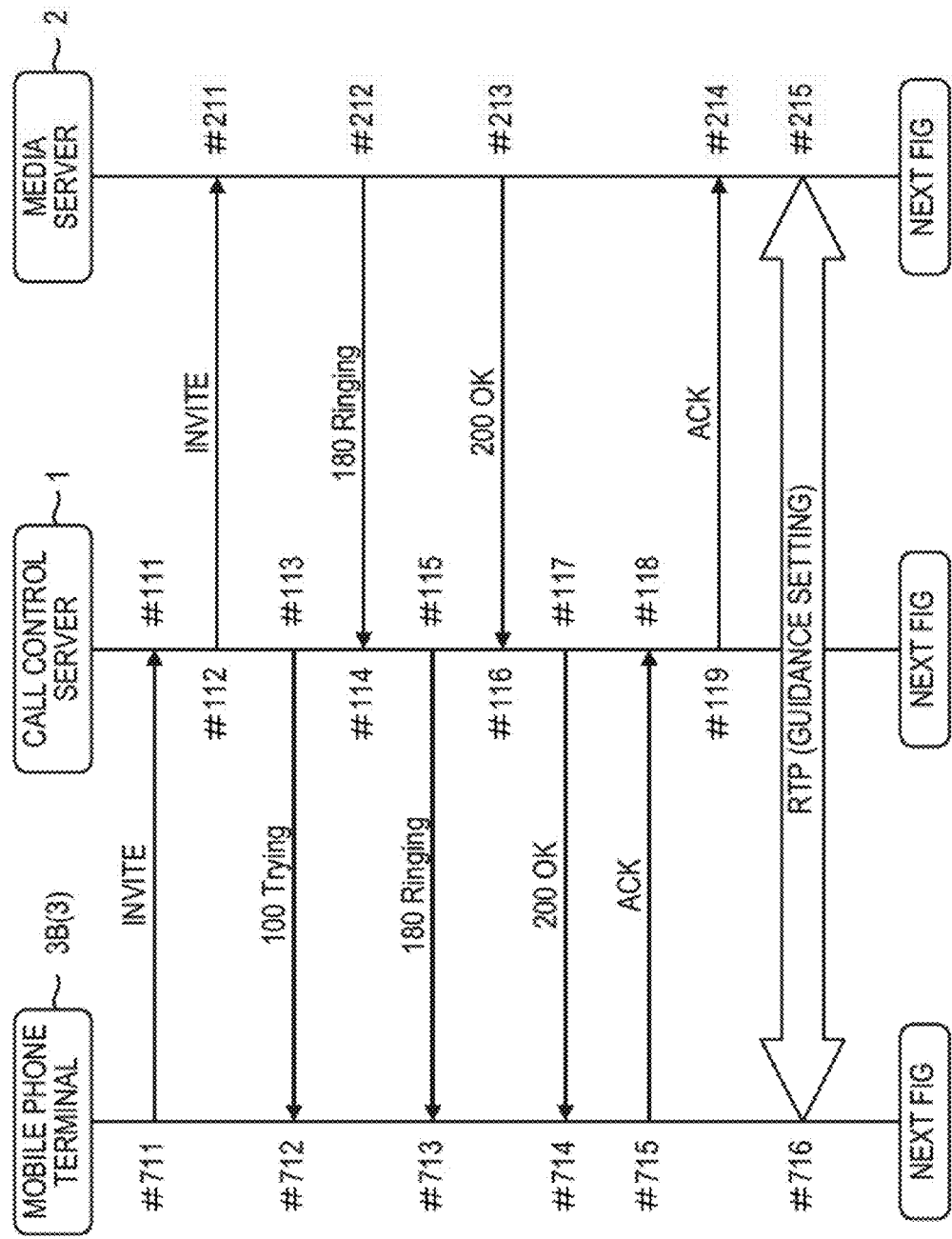
FIG. 6 is a sequence diagram illustrating a procedure for guidance registration process.
Figure 7:
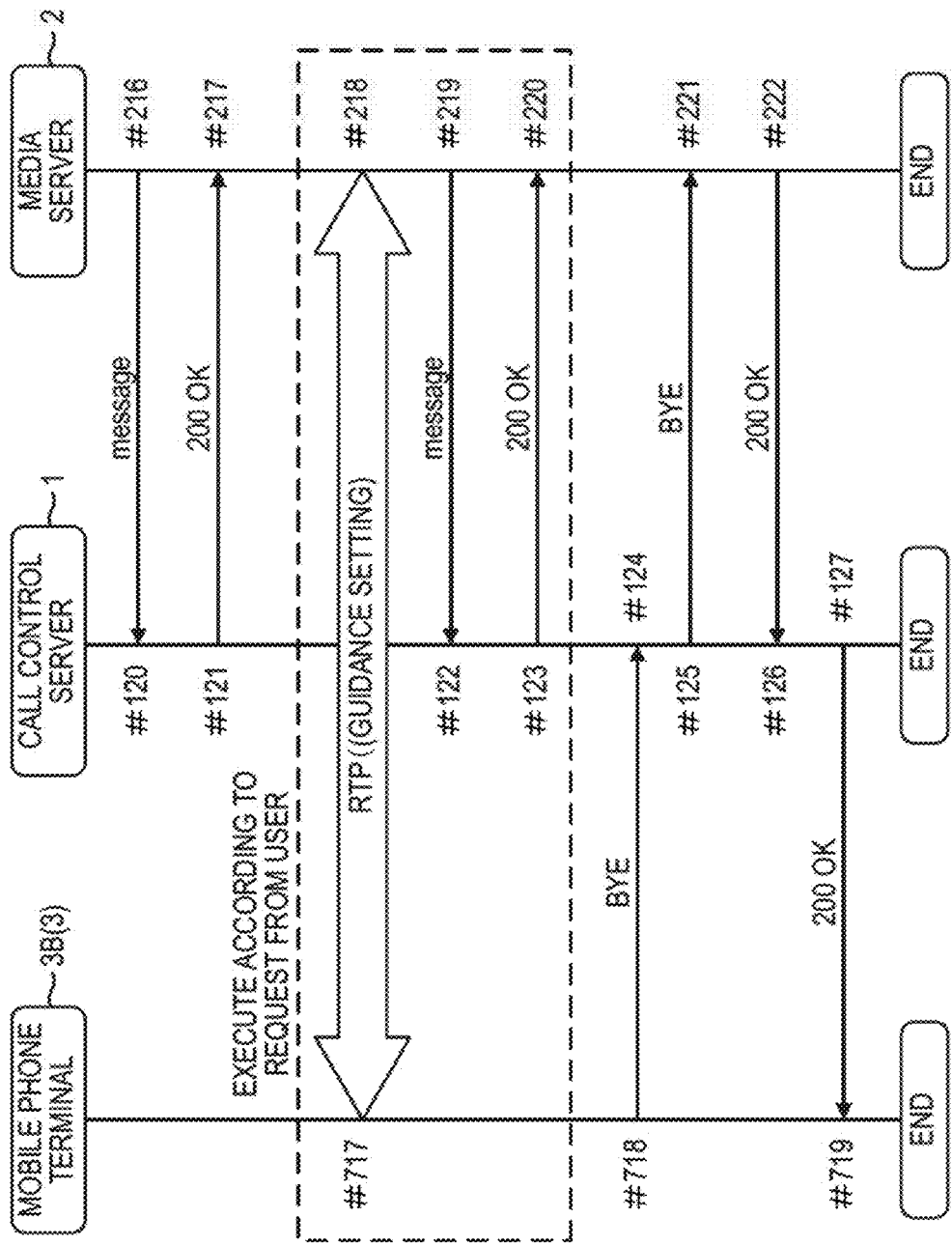
FIG. 7 is a sequence diagram illustrating a procedure for guidance registration process.
Figure 10:
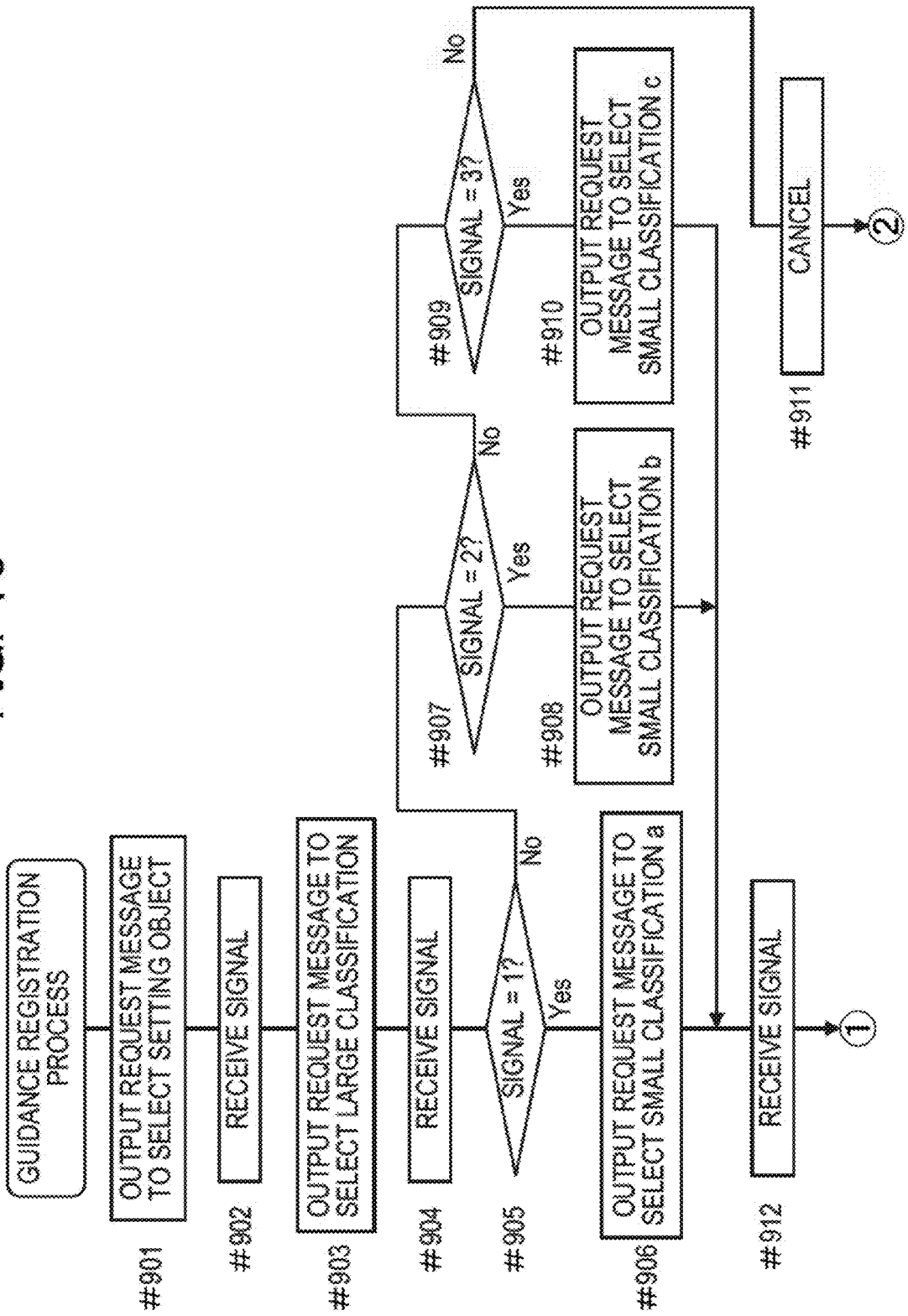
FIG. 10 is a flowchart explaining an example of a guidance registration process flow of the media server.
Figure 11:
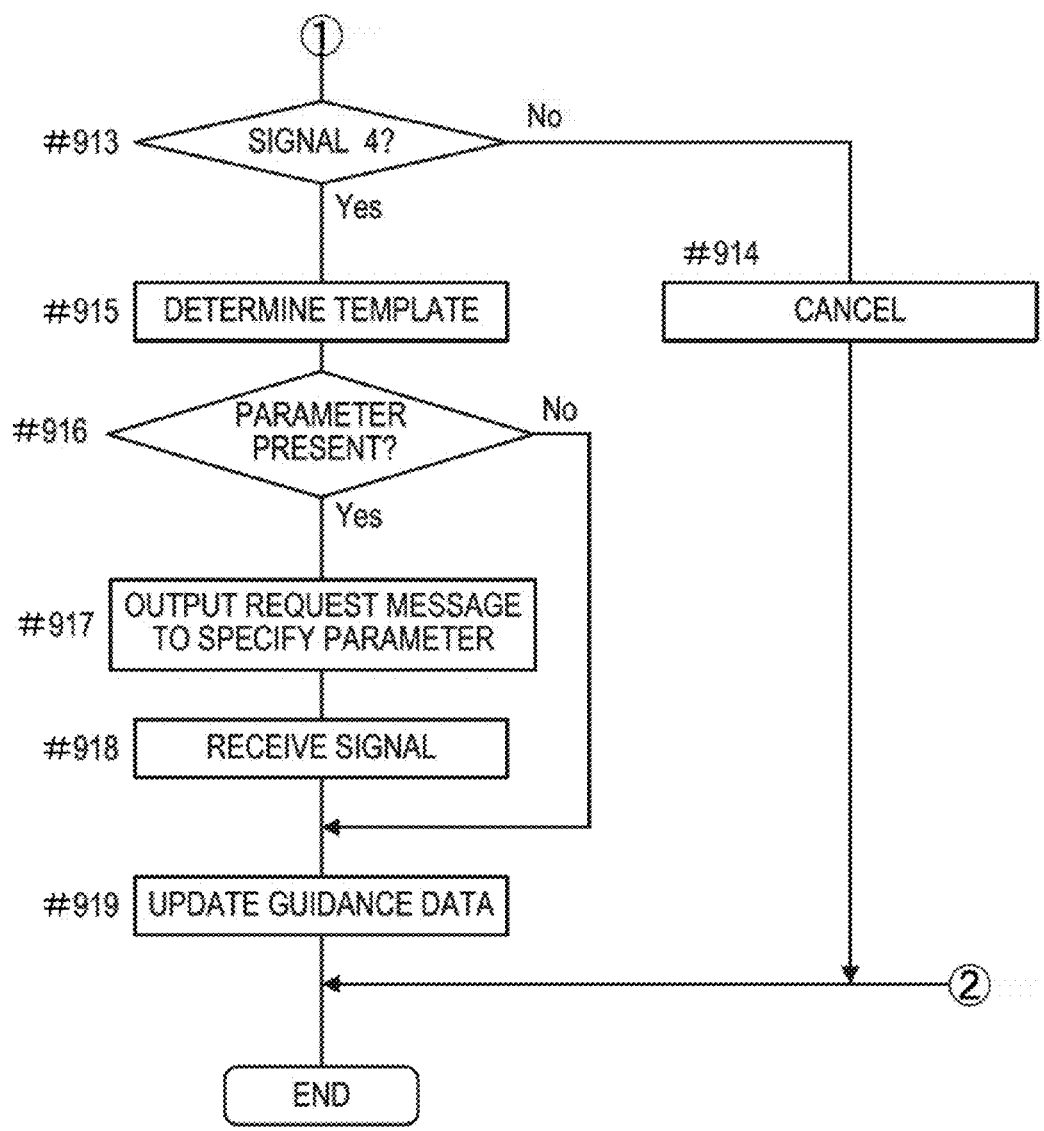
FIG. 11 is a flowchart explaining an example of a guidance registration process flow of the media server.

FIGS. 6 and 7 together form a sequence diagram illustrating a procedure for guidance registration process. FIG. 8 illustrates an example of a template table TLA. FIG. 9 illustrates an example of a guidance table TLB. FIGS. 10 and 11 together form a flowchart explaining an example of a guidance registration process flow of the media server 2.

In FIG. 4, the inter-device connection control section 101 of the call control server 1 performs processes of establishing a session between a device of the calling party and a device of the called party, and terminating the session according to a SIP request message. The details about these processes will be described later.

In FIG. 5, the connection control section 201 of the media server 2 controls communication to and from the mobile phone terminal 3 based on an RTP (Real-time Transport Protocol).

The guidance registration process section 202 performs a process of registering guidance data to be transmitted to a calling user when a called user cannot answer a call.

Here, as an example, assuming a case where a user Ub sets a guidance, each section and process procedure of the mobile phone terminal 3B will be described with reference to FIGS. 6 and 7.

When the user Ub operates the mobile phone terminal 3B to dial a specific phone number, the mobile phone terminal 3B transmits an INVITE message together with the phone number to the call control server 1 (#711 of FIG. 6).

When the INVITE message is received (#111), the inter-device connection control section 101 of the call control server 1 determines that the INVITE message is related to a request to connect to the media server 2, and makes a call by transmitting the INVITE message to the media server 2 (#112). At the same time, the inter-device connection control section 101 of the call control server 1 transmits a Trying message to the mobile phone terminal 3B (#113).

When the INVITE message is received (#211), the connection control section 201 of the media server 2 returns a Ringing message to the call control server 1 (#212). If the guidance registration process section 202 can start processing, the connection control section 201 of the media server 2 transmits an OK message to the call control server 1 (#213).

When the Ringing message is received (#114), the inter-device connection control section 101 transfers the Ringing message to the mobile phone terminal 3B (#115). Afterward, when the OK message is received (#116), the inter-device connection control section 101 transfers the OK message to the mobile phone terminal 3B (#117).

The mobile phone terminal 3B sequentially receives the Trying message, the Ringing message, and the OK message (#712 to #714). Then, the mobile phone terminal 3B transmits an ACK message to the call control server 1 (#715).

When the ACK message is received from the mobile phone terminal 3B (#118), the inter-device connection control section 101 transfers the ACK message to the media server 2 (#119).

When the connection control section 201 receives the ACK message (#214), a session is established between the media server 2 and the mobile phone terminal 3B and an RTP communication is enabled. Then, the mobile phone terminal 3B can transmit a signal corresponding to a button pressed by the user Ub to the media server 2. Then, the media server 2 transmits a voice corresponding to the signal received from the mobile phone terminal 3B to the mobile phone terminal 3B.

When a session is established between the mobile phone terminal 3B and the media server 2, the user Ub operates the operation button group 30e to set the guidance to be transmitted to a calling party when the user Ub cannot answer a call. Then, the guidance registration process section 202 of the media server 2 performs a guidance data registration process according to the signal received from the mobile phone terminal 3B. At this time, the media server 2 and the mobile phone terminal 3B perform communication based on the RTP (#215 and #716). In addition, data stored in the guidance table etc. storage section 2K1 is used for the registration process.

The guidance table etc. storage section 2K1 stores a template table TLA, and further stores a guidance table TLB for each user.

As illustrated in FIG. 8, the template table TLA stores template data DTA which is text (hereinafter referred to as "template text") used as a template of the guidance.

A piece of template data DTA contains a template ID for discriminating the template text from another template text, and text data representing the guidance contents. Note that "X" in text data is a parameter which the user can arbitrarily set as described later.

The guidance table TLB is associated with an identifier (for example, a phone number) of the user provided with the guidance table TLB. A user may register ten pieces of guidance in his/her own guidance table TLB. As illustrated in FIG. 9, a guidance table TLB stores guidance data DTB for each guidance.

The "guidance ID" of the guidance data DTB is an ID for discriminating the guidance from another guidance. The "template ID" is a template ID of the template text used for the guidance. The "parameter" is a value to be assigned to the parameter X in the template data DTA corresponding to the template ID.

A guidance ID of "0", "1", "2", . . . , "9" is preliminarily assigned to each guidance data DTB starting with the top of the guidance table TLB. The user can arbitrarily set the template IDs and parameters.

Here, the operation of the user Ub and the procedure for the guidance registration process section 202 will be described with reference to the flowcharts in FIGS. 10 and 11.

The user Ub presses a specific button to start the guidance setting. Then, a signal for starting the guidance setting is transmitted from the mobile phone terminal 3B to the media server 2.

When this signal is received, the media server 2 activates the guidance registration process section 202 to start the guidance setting registration process.

The guidance registration process section 202 requests the user Ub to select which guidance setting to start from among the ten pieces of guidance for the user Ub (#901). For example, the guidance registration process section 202 transmits a voice message "Please press a guidance ID you want to set" to the mobile phone terminal 3B.

Then, the mobile phone terminal 3B outputs the voice message. When the user Ub presses one of the buttons 0 to 9, the signal indicating the pressed button is transmitted from the mobile phone terminal 3B and reaches the media server 2 (#902).

The guidance registration process section 202 requests the user Ub to select a large classification of template text used for guidance selected by the user Ub (#903). For example, the guidance registration process section 202 transmits, to the mobile phone terminal 3B, the following voice message "Now, let's start the guidance setting when a call cannot be received for guidance number Y. Please select a message type from the following three message types. Press number 1 to select an in-a-meeting message, number 2 to select a while-driving message, and number 3 to select other message types. Press number 4 to cancel the setting." Note that "Y" refers to a number assigned to the signal received at step #902.

Then, the mobile phone terminal 3B outputs the voice message. When the user Ub presses one of the buttons "1" to "4", the signal indicating the pressed button is transmitted from the mobile phone terminal 3B and reaches the media server 2 (#904).

When the received signal indicates "1" (#905: Yes), the guidance registration process section 202 prompts the called party to select the template text to be used as the guidance message indicating that the called party is in a meeting (#906). For example, the guidance registration process section 202 transmits, to the mobile phone terminal 3B, the following voice message "The in-a-meeting message was selected. Further, select one of the following three messages to be returned. Press number 1 to select "I'm currently in a meeting. I'll call you back in X hours". Press number 2 to select "I'm currently in a meeting. I'll call you back tomorrow". Press number 3 to select "I'm currently in a meeting. Please call me back sometime later". Press number 4 to cancel the setting".

Alternatively, when the received signal indicates "2" (#907: Yes), the guidance registration process section 202 selects the template text to be used as the guidance message indicating that the called party is driving (#908). For example, the guidance registration process section 202 transmits, to the mobile phone terminal 3B, the following voice message "The while-driving message was selected. Further, select one of the following three messages to be returned. Press number 1 to select "I'm currently driving. I'll call you back in X hours". Press number 2 to select "I'm currently driving. I'll call you back tomorrow". Press number 3 to select "I'm currently driving. Please call me back sometime later". Press number 4 to cancel the setting".

Alternatively, when the received signal indicates "3" (#909: Yes), the guidance registration process section 202 selects the template text to be used as the guidance message indicating that the called party is not in a meeting or driving (#910). For example, the guidance registration process section 202 transmits, to the mobile phone terminal 3B, the following voice message "The other message was selected. Further, select one of the following three messages to be returned. Press number 1 to select "I'm currently on a train. I'll call you back in X hours". Press number 2 to select "I'm currently in a hospital. I'll call you back when I'm out of the hospital". Press number 3 to select "I'm currently working. I'll call you back after work". Press number 4 to cancel the setting".

However, when the received signal indicates "4" (#909: No), the guidance registration process section 202 cancels the setting registration process (#911).

When the voice message is received from the media server 2, the mobile phone terminal 3B outputs the voice message. When the user Ub presses one of the buttons "1" to "4", the signal indicating the pressed button is transmitted from the mobile phone terminal 3B and reaches the media server 2 (#912).

When the received signal indicates "4" (#913: No in FIG. 11), the guidance registration process section 202 cancels the setting registration process (#914).

However, when the received signal indicates one of "1" to "3" (#913: Yes in FIG. 11), the template text to be used as guidance is determined to be the template text having a template ID obtained by combining the number indicated by the signal received at step #904 of FIG. 10 with the number indicated by the signal received at step #912 (#915).

For example, if the number indicated by the signal received at step #904 is "3" and the number indicated by the signal received at step #912 is "1", the template text having a template ID "31" is determined.

Further, when the determined template text contains the parameter X (#916: Yes), the guidance registration process section 202 transmits, to the mobile phone terminal 3B, a voice message requesting the user to specify a value to be used as the parameter (#917), and receives the specified value (#918). Note that the value of the parameter may be specified immediately before the guidance is used as described later. Therefore, the process of receiving the specified value may be omitted from the setting registration.

Then, the guidance registration process section 202 updates the guidance data DTB as follows (#919). The guidance registration process section 202 searches the guidance table TLB of the user Ub for guidance data DTB having the same guidance ID as the number indicated by the signal received in step #902 of FIG. 10. Then, the guidance registration process section 202 writes, in the "template ID" of the guidance data DTB, the template ID of the template text determined at step #915. Further, when the signal of the parameter value is received at step #918, the guidance registration process section 202 writes the parameter value in the "parameter" of the guidance data DTB.

Note that when the user Ub presses a button other than the presented numbers, the mobile phone terminal 3B outputs a voice message prompting the user to retry the selection.

Now, returning to FIGS. 6 and 7, when the guidance registration process at steps #215 and #716 of FIG. 6 is completed, the guidance registration process section 202 informs the call control server 1 of the present registration contents, namely, what is set to which guidance of which user (#216 of FIG. 7).

The guidance table storage section 1K1 of the call control server 1 stores the guidance tables TLB', one for each user, having the same contents as those of the guidance tables TLB which the media server 2 has.

When the notice is received from the media server 2 (#120), the call control server 1 uses the notice to update the guidance data DTB' of the guidance table TLB' of the user Ub according to the operation of the user Ub in the same manner as the process in step #919 of FIG. 11. After the update, the OK message is returned from the call control server 1 to the media server 2 (#121 and #217).

Thus, the process related to the setting registration of guidance data DTB and DTB' for a piece of guidance is completed.

In order to set another piece of guidance, the user Ub only needs to continue performing the same operation as described above. Then, the call control server 1, the media server 2, and the mobile phone terminal 3B execute the same processes as described above (#122, #123, #218 to #220, and #717 of FIG. 7; and #901 to #919 of FIGS. 10 and 11).

Then, when the user Ub presses a communication termination button, the mobile phone terminal 3B transmits a BYE message to the call control server 1 (#718). When the BYE message is received, the inter-device connection control section 101 of the call control server 1 transfers the BYE message to the media server 2 (#124, #125, and #221). Then, the inter-device connection control section 101, the connection control section 201, and the mobile phone terminal 3B perform the session disconnection processes (#222, #126, #127, and #719).

[Guidance Output in an Unrespondable Time and Callback Time Registration Process]

FIGS. 12 to 16 each is a sequence diagram illustrating an example of a flow of the guidance provision process and the callback time registration process. FIG. 17 illustrates an example of callback time data DTC stored in a callback time data storage section 2K2.

The guidance set as described above is outputted to the calling user when the called user cannot answer the call. At this time, a process of setting for informing the user that the time to make a return call (callback time) has come is also performed. The guidance output and callback time setting process are performed by the connection destination change control section 103, the guidance transmission request receiving section 102, the guidance table storage section 1K1, and the callback time data storage section 1K2 illustrated in FIG. 4; and the callback time registration process section 203, the guidance table etc storage section 2K1, and the callback time data storage section 2K2 illustrated in FIG. 5; and mobile phone terminals 3 for the calling party and the called party, and the like.

Hereinafter, as an example, assuming a case where the user Ua calls the user Ub, each section of the call control server 1, each section of the media server 2, and the process of the mobile phone terminals 3A and 3B will be described with reference to FIGS. 12 to 16.

Figure 12:
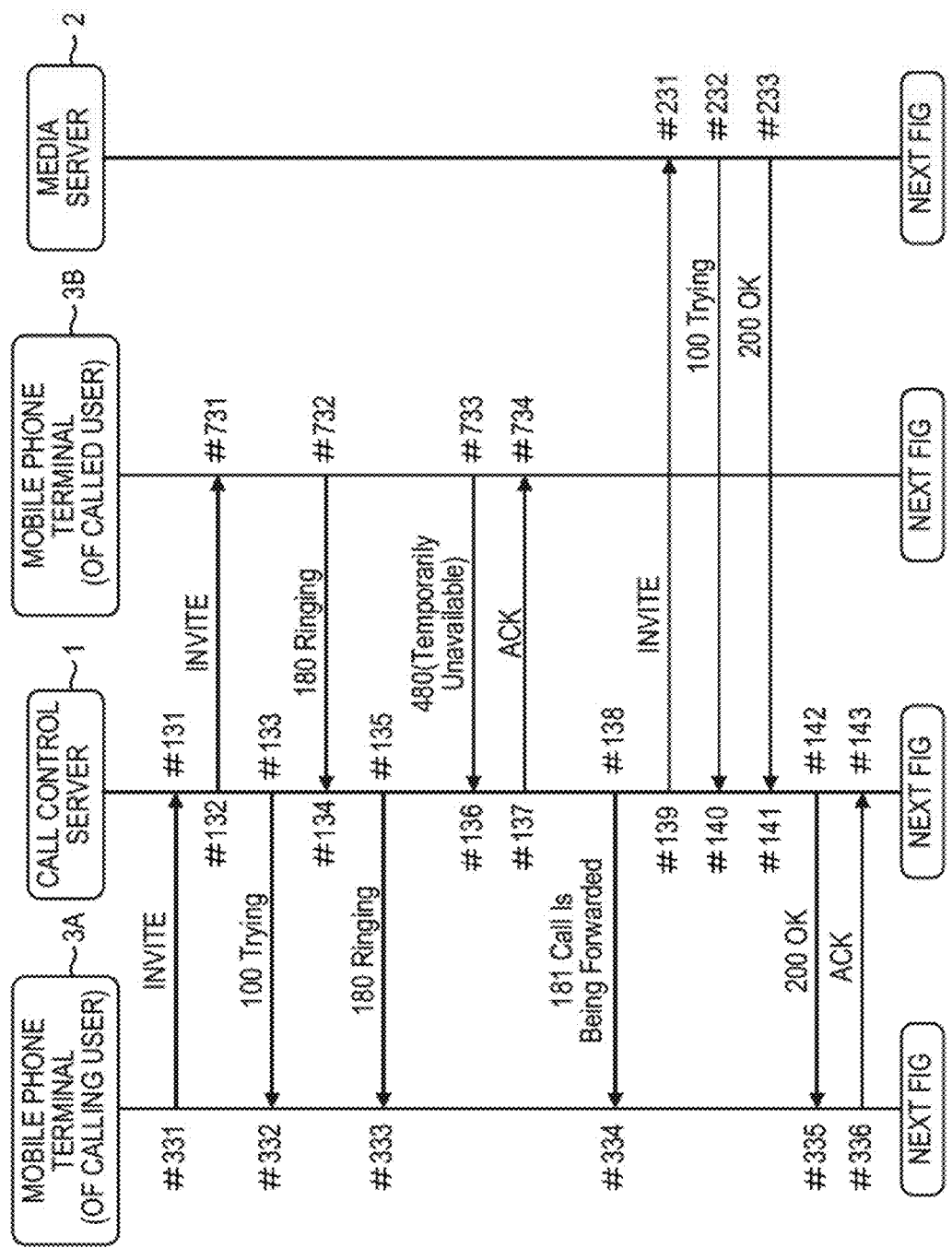
FIG. 12 is a sequence diagram illustrating an example of a flow of a guidance provision process and a callback time registration process.

When the user Ua dials the phone number of the mobile phone terminal 3B by operating the mobile phone terminal 3A, the mobile phone terminal 3A transmits the INVITE message together with the phone number to the call control server 1 (#331 of FIG. 12).

When the INVITE message is received (#131), the inter-device connection control section 101 of the call control server 1 determines that the INVITE message is related to a request to connect to the mobile phone terminal 3B, and makes a call by transmitting the INVITE message to the mobile phone terminal 3B (#132). At the same time, the inter-device connection control section 101 of the call control server 1 transmits the Trying message to the mobile phone terminal 3A (#133 and #332).

When the INVITE message is received (#731), the mobile phone terminal 3B returns the Ringing message to the call control server 1 (#732). When the Ringing message is received (#134), the inter-device connection control section 101 transfers the Ringing message to the mobile phone terminal 3A (#135 and #333). At this time, the mobile phone terminal 3A outputs a ringing tone, and the mobile phone terminal 3B outputs a ring-back tone. In this manner, a call is made from the mobile phone terminal 3A to the mobile phone terminal 3B.

The user Ub cannot answer the call and thus wants to transmit a piece of guidance to the calling party (user Ua). In that case, the user Ub presses the guidance ID for an appropriate piece of guidance (for example, corresponding to the reason why the user Ub cannot answer the call) from the user's Ub own ten pieces of guidance. If the user Ub wants to specify the value of parameter X, the user Ub enters the value following the guidance ID. For example, when the guidance ID is "1" and the parameter X is "3", the user Ub presses "13".

Then, the mobile phone terminal 3B transmits a signal corresponding to the pressed button together with a temporarily unavailable message to the call control server 1 (#733).

When the signal and the temporarily unavailable message are received (#136), the connection destination change control section 103 of the call control server 1 returns the ACK message to the mobile phone terminal 3B (#137). At the same time, in order to change the connection destination of the mobile phone terminal 3A, the connection destination change control section 103 of the call control server 1 transmits a call forwarding message to the mobile phone terminal 3A (#138) and transmits the INVITE message to the media server 2 (#139).

When the INVITE message is received (#231), the connection control section 201 of the media server 2 returns the Trying message to the call control server 1 (#232). Further, if the guidance provision can be started, the connection control section 201 of the media server 2 transmits the OK message to the call control server 1 (#233).

When the Trying message and the OK message are received (#140 and #141), the inter-device connection control section 101 transfers the OK message to the mobile phone terminal 3A (#142).

When the OK message is received (#335), the mobile phone terminal 3A transmits the ACK message to the call control server 1 (#336).

Figure 13:
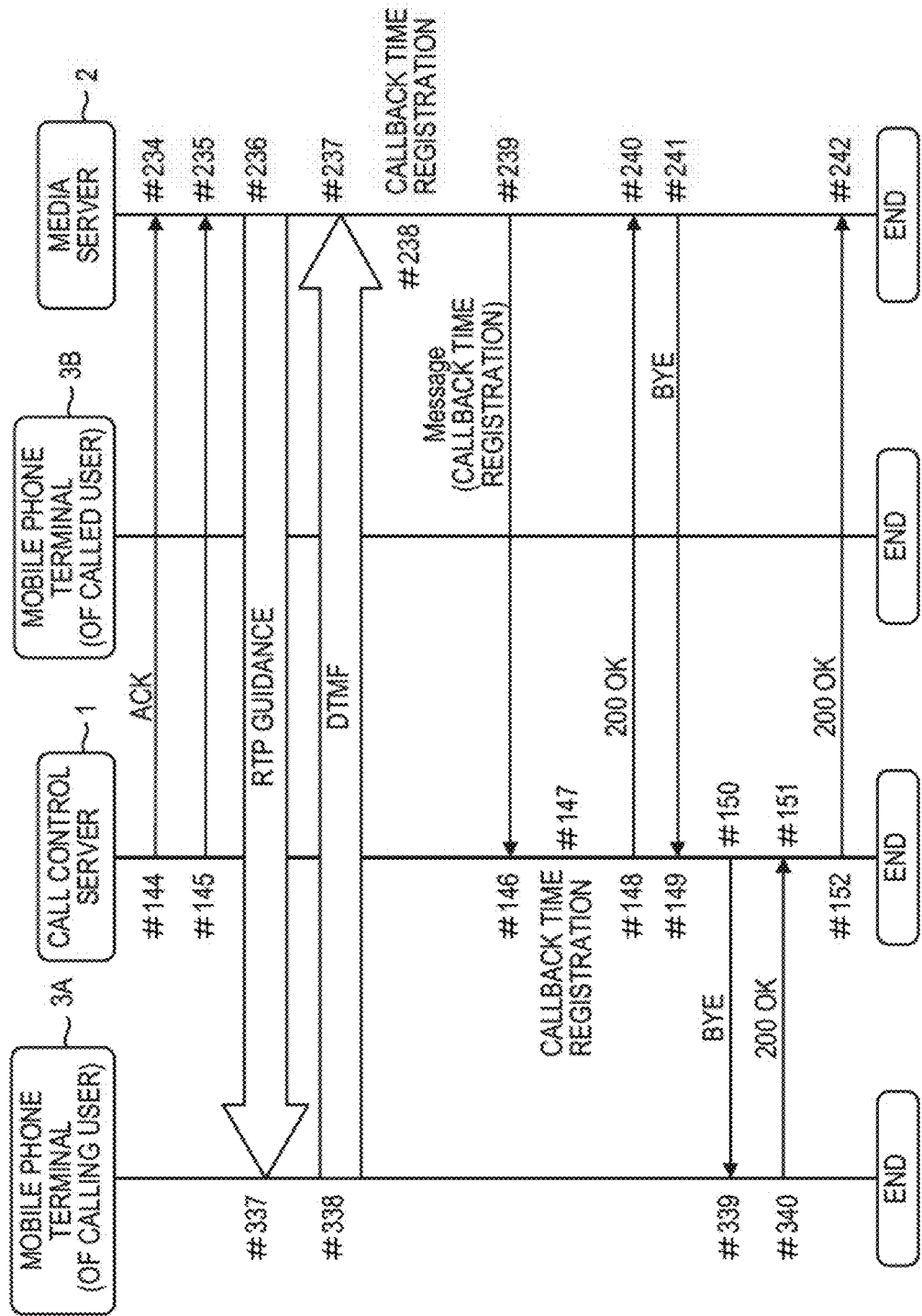
FIG. 13 is a sequence diagram illustrating an example of a flow of the guidance provision process and the callback time registration process.

When the ACK message is received from the mobile phone terminal 3A (#143), the inter-device connection control section 101 transfers the ACK message to the media server 2 (#144 of FIG. 13). Further, the inter-device connection control section 101 transfers the signal indicating the guidance ID or the signal indicating the guidance ID and the parameter value, which is received from the mobile phone terminal 3B, to the media server 2 (#145).

When the connection control section 201 receives the ACK message (#234), a session is established between the media server 2 and the mobile phone terminal 3A and an RTP communication is enabled. Then, the guidance transmission process section 206 transmits, to the mobile phone terminal 3A, the guidance corresponding to the signal received from the call control server 1 with a voice (#236). Note that if the guidance contains the parameter X, the value indicated by the signal is converted into a voice message to be transmitted.

For example, the received signal indicates "32" and it is assumed that the contents of the template table TLA and the guidance table TLB of the user Ub are as illustrated in FIGS. 8 and 9 respectively. In that case, the guidance transmission process section 206 first searches the guidance table TLB for a guidance data DTB having the guidance ID "3" which has the template ID "11". Then, the guidance transmission process section 206 searches the template table TLA for template data DTA having the template ID "11". Then, the guidance transmission process section 206 searches the text data for the parameter X and assigns "2" to the parameter X, resulting in a voice message "I'm currently in a meeting. I'll call you back in two hours" which is transmitted to the mobile phone terminal 3A.

The mobile phone terminal 3A receives and outputs the voice guidance from the media server 2 (#337).

The user Ua hears the guidance and terminates the call. Note that when the voice message says that the user Ub will call the user Ua back in a specific time such as "I'll call you back in two hours", the user Ua can select whether or not to accept the callback time. Therefore, the media server 2 transmits and outputs, to the mobile phone terminal 3A, a voice message such as "press number 1 to accept the callback time, or press number 2 not to accept the callback time" following the voice message saying that the user Ub will call the user Ua back in a specific time in the above guidance.

When the user Ua presses number 1 or 2, the mobile phone terminal 3A transmits the signal indicating the pressed number to the media server 2 (#338).

When the signal is received from the mobile phone terminal 3A (#237), and if the signal indicates number 1, the callback time registration process section 203 of the media server 2 generates callback time data DTC which contains the individual identifiers (for example, phone numbers) of the called party (user Ub) and the calling party (user Ua) and the time (callback time) when the called party will make a return call to the calling party and registers the callback time data DTC in the callback time data storage section 2K2 (#238). This allows a plurality of pieces of callback time data DTC to be accumulated in the callback time data storage section 2K2 as illustrated in FIG. 17. Note that the callback time is obtained by adding the time (parameter value) specified by the user Ub to the current time.

As described later, when the callback is terminated or no longer needed, the callback time data DTC of the callback is deleted from the callback time data storage section 2K2.

The call control server 1 is also provided with a callback time data storage section 1K2 which stores callback time data DTC' having the same contents as those of the callback time data DTC. The callback time registration process section 203 of the media server 2 stores the generated callback time data DTC in its own callback time data storage section 2K2 as described above as well as transmits the callback time data DTC to the call control server 1 (#239).

When the callback time data DTC is received (#146), the call control server 1 registers the callback time data DTC as the callback time data DTC' in the callback time data storage section 1K2 (#147). When the registration is successful, the OK message is transmitted to the media server 2 (#148 and #240).

When the guidance output process and the callback time setting process are completed, the call control server 1, the media server 2, and the mobile phone terminal 3A each disconnect the session between the media server 2 and the mobile phone terminal 3A (#149 to #152, #241, #242, #339, and #340).

Alternatively, if the user Ua cannot accept the callback time specified by the user Ub, the user Ua presses number 2 as described above. Then, at step #338, the mobile phone terminal 3A transmits the signal indicating number 2 to the media server 2. Afterward, each device executes the process by the procedure illustrated in FIGS. 14 to 16 instead of steps #146, #238, #339, and later.

Figure 14:
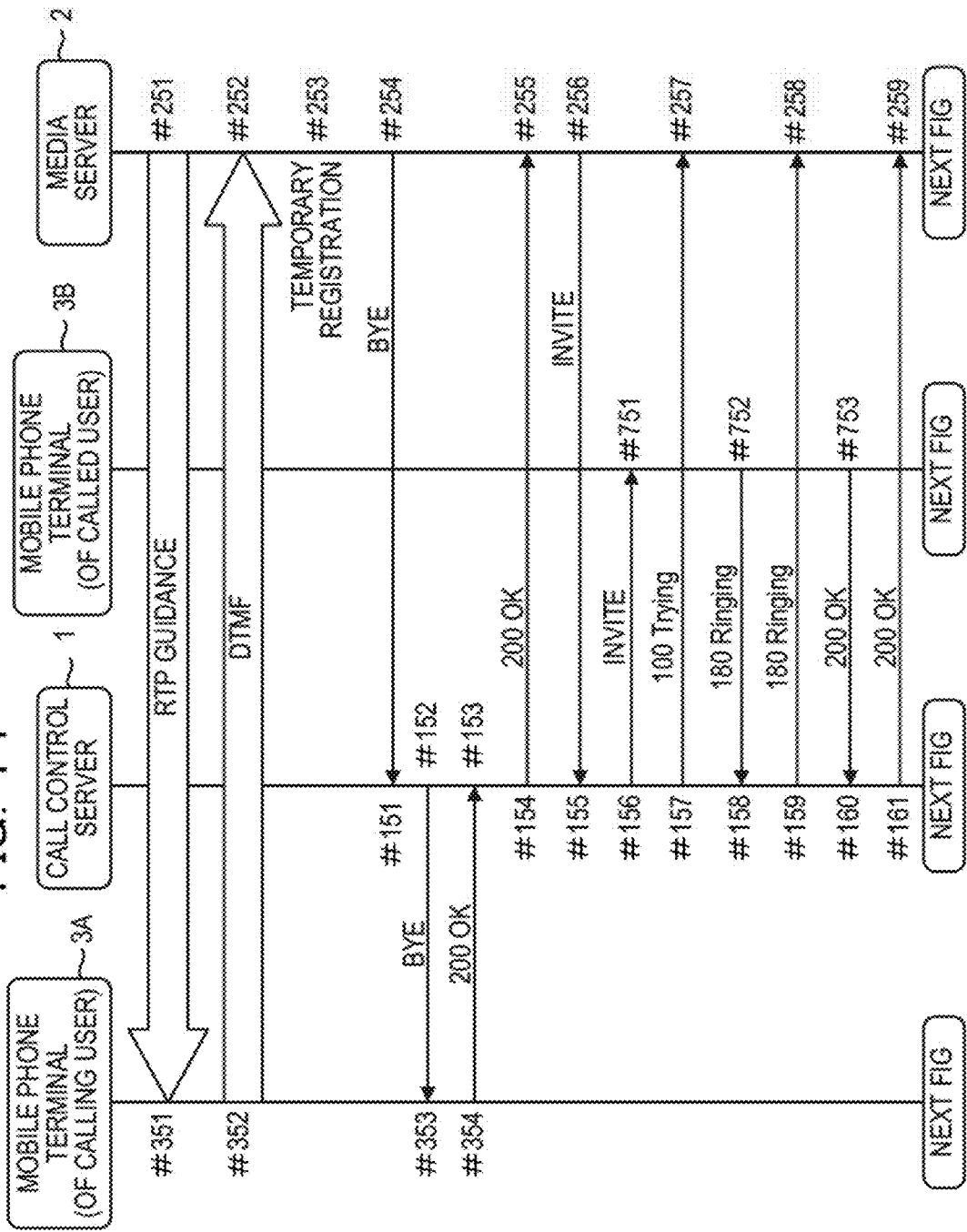
FIG. 14 is a sequence diagram illustrating an example of a flow of the guidance provision process and the callback time registration process.

When the signal indicating that the user Ua cannot accept the specified callback time is received, the callback time registration process section 203 of the media server 2 prompts the user Ua to specify a desired callback time in hours from the current time (#251 of FIG. 14). For example, the callback time registration process section 203 transmits and outputs, to the mobile phone terminal 3A, a voice message such as "Please specify your desired callback time in hours from now".

The mobile phone terminal 3A receives and outputs the voice message (#351). The user Ua specifies his/her desired time. For example, the user Ua presses number 1 to specify one hour from now. The mobile phone terminal 3A transmits the signal indicating the specified time to the media server 2 (#352).

When the signal is received (#252), the callback time registration process section 203 generates callback time data DTC indicating the phone number and the callback time of each of the called party (user Ub) and the calling party (user Ua), and registers the individual callback time data DTC in the callback time data storage section 2K2 (#253). Note that here, the callback time is obtained not by the time specified by the called party but by the time specified by the calling party, namely, the time indicated by the received signal. The time is obtained by adding the time specified by the calling party to the current time. This callback time cannot be determined unless the time is confirmed by the called party. Therefore, this callback time data DTC is assumed to be temporarily registered.

When the callback time data DTC is temporarily registered, the call control server 1, the media server 2, and the mobile phone terminal 3A each disconnect the session between the media server 2 and the mobile phone terminal 3A (#151 to #154, #254, #255, #353, and #354).

In order to obtain the confirmation from the user Ub, the media server 2 performs the following processing. The connection control section 201 establishes a session to and from the mobile phone terminal 3B by dialing the phone number of the mobile phone terminal 3B or the like. The process procedure of each device in this case is basically the same as that for establishing a session between the two devices through the call control server 1 as described above (#155 to #163 of FIG. 15, #256 to #260 of FIG. 15, and #751 to #754 of FIG. 15).

When the session is established, the callback time registration process section 203 prompts the user Ub to respond whether or not to accept that the user Ub will call back the user Ua at the time when or after the time specified by the user Ua has elapsed (#261). For example, the callback time registration process section 203 transmits and outputs, to the mobile phone terminal 3B, a voice message such as "The calling party wants you to call back when the time T has elapsed. Do you accept the callback time desired by the calling party? Press number 1 to accept the callback time, or press number 2 not to accept the callback time". Note that "T" is outputted by being replaced with the time specified by the user Ua.

The mobile phone terminal 3B receives and outputs the voice message (#755). The user Ub selects number 1 or 2 according to the voice message.

When the user Ub presses number 1 or 2, the mobile phone terminal 3B transmits the signal indicating the pressed number to the media server 2 (#756).

When the signal is received from the mobile phone terminal 3B (#262) and if the signal indicates 1, the callback time registration process section 203 of the media server 2 accepts the temporarily registered callback time data DTC as the formal data to be formally registered (#263), and transmits the callback time data DTC to the call control server 1 (#264).

When this callback time data DTC is received by the call control server 1 (#164), the callback time data DTC is registered in the callback time data storage section 1K2 as callback time data DTC' (#165).

The successful registration message is transmitted from the call control server 1 to the media server 2 (#166 and #265), the call control server 1, the media server 2, and the mobile phone terminal 3A disconnect the session between the media server 2 and the mobile phone terminal 3B (#167 to #170, #266, #267, #757, and #758).

Alternatively, if the user Ub does not accept the desire of the user Ua, namely, when the signal indicating number 2 is received at step #756, the callback time registration process section 203 performs a retry process of prompting the user Ua whether or not to accept the time first specified by the user Ub (namely, the callback time indicated by the signal received at step #235 of FIG. 13) as follows. Note that the callback time data DTC temporarily registered in the callback time data storage section 2K2 is deleted.

The connection control section 201 of the media server 2 establishes a session to and from the mobile phone terminal 3A by dialing the phone number of the mobile phone terminal 3A or the like. The process procedure of each device in this case is basically the same as that for establishing a session between the two devices through the call control server 1 as described above (#181 to #189, #281 to #285, and #381 to #384 of FIG. 16).

The callback time registration process section 203 transmits a message informing that the user Ub rejects the time specified by the user Ua and a message prompting the user Ua to select whether or not to accept the time first specified by the user Ub to the mobile phone terminal 3A (#286).

The mobile phone terminal 3A receives and outputs the message transmitted from the media server 2 (#385).

The user Ua hears the guidance, and presses number 1 to accept the callback time or presses number 2 not to accept the callback time. The mobile phone terminal 3A transmits the signal indicating the pressed number to the media server 2 (#386).

Afterward, the processes related to the formal registration or temporary registration of callback time data DTC by the callback time registration process section 203 and the like according to the user Ua are performed as described above.

When the user Ua selects number 1, the processes at steps #146 to #152, #238 to #242, #339, and #340 of FIG. 13, namely, the registration process of callback time data DTC based on the time specified by the user Ub is performed.

Figure 15:
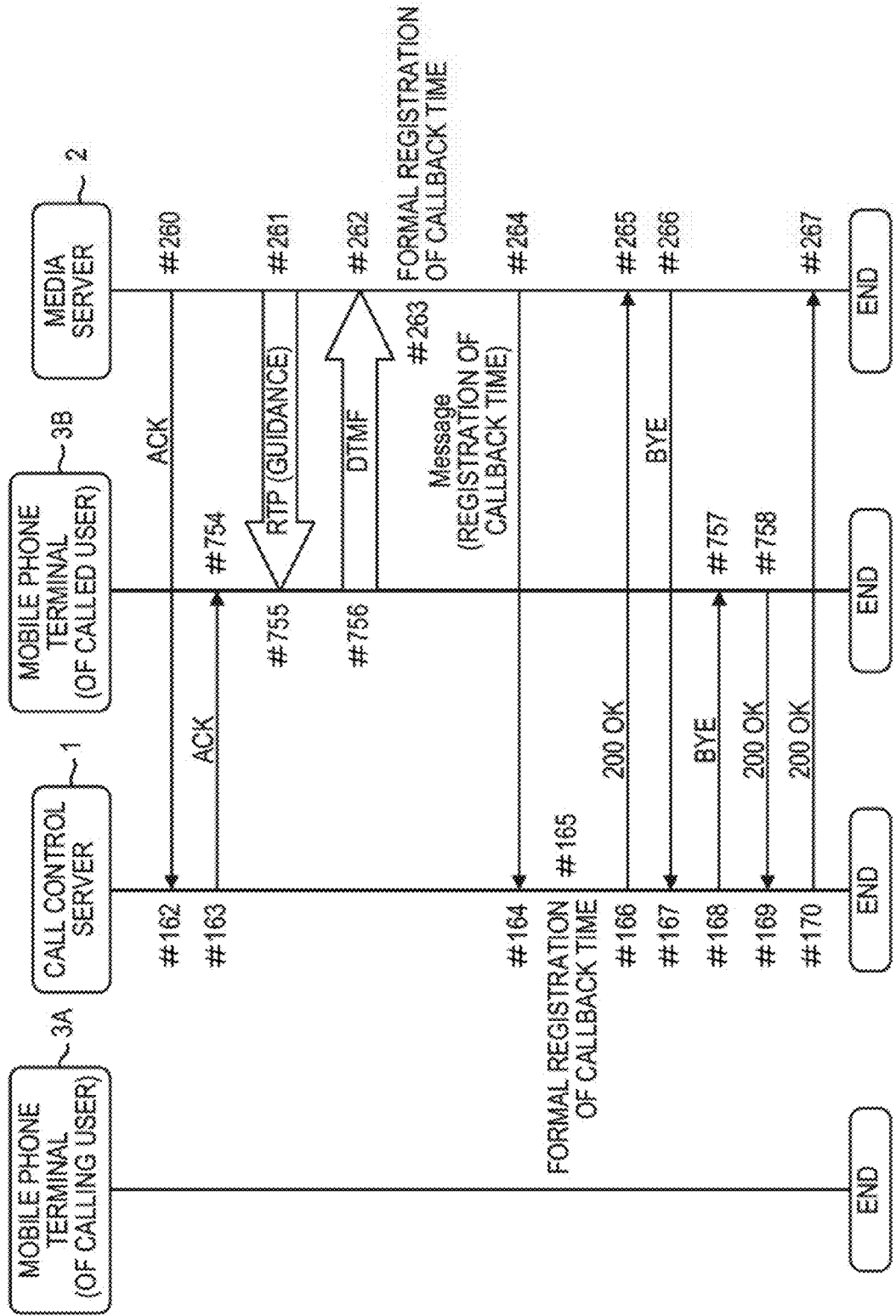
FIG. 15 is a sequence diagram illustrating an example of a flow of the guidance provision process and the callback time registration process.
Figure 16:
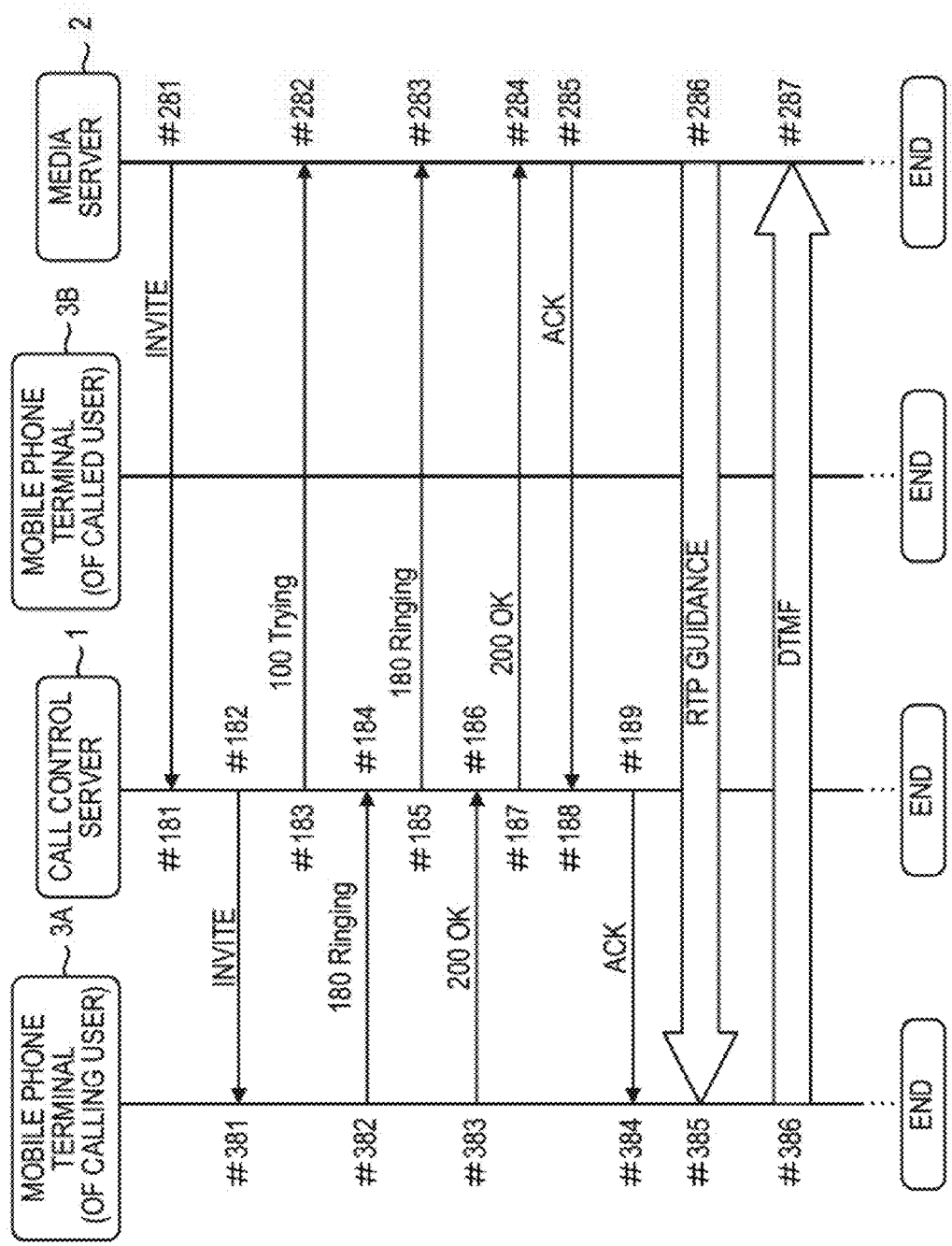
FIG. 16 is a sequence diagram illustrating an example of a flow of the guidance provision process and the callback time registration process.

Alternatively, when the user Ua selects number 2, the processes at steps #151 of FIG. 14 to #163 of FIG. 15, #251 to #262, #351 to #354, and #751 to #756, namely, the process of temporarily registering the callback time data DTC based on the time desired by the user Ua and the process of confirming whether or not the user Ub accepts the callback time are performed. Further, when the user Ub accepts the callback time, the processes at steps #164 to #170, #263 to #267, #757, and #758 of FIG. 15, namely, the process of changing the temporarily registered callback time data DTC to formally registered callback time data DTC are performed. When the user Ub does not accept the callback time, the temporarily registered callback time data DTC is discarded, and the processes illustrated in FIG. 16 are performed.

If both the user Ua and the user Ub continue not accepting the callback time, the temporary registration of callback time data DTC and the discard thereof are repeated, and the formal registration is not completed. Therefore, the number of times of the temporary registrations may be limited. Alternatively, the time limit may be imposed on the temporary registrations. Then, when the number of times of the temporary registrations exceeds a specific number or when a specific time has elapsed since the guidance was outputted to the user Ua, a message indicating that the callback time registration process has failed may be transmitted from the callback time registration process section 203 to the mobile phone terminals 3A and 3B and outputted to cancel the registration related process.

It should be noted that a flag may be set to the individual callback time data DTC to identify whether the callback time data DTC is temporarily registered or formally registered.

[Process for Prompting the User for a Callback]

Figure 18:
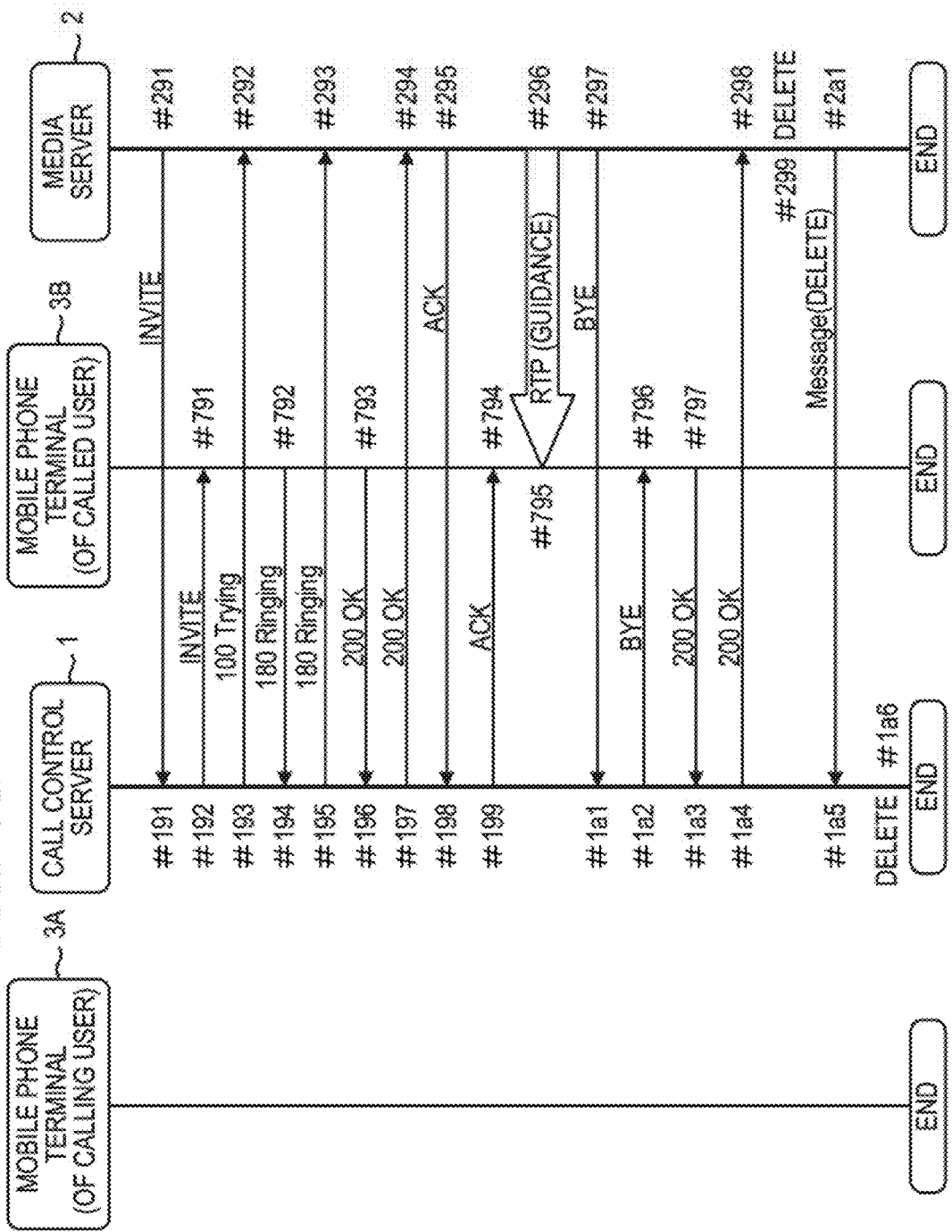
FIG. 18 is a sequence diagram illustrating an example of a flow of an alarm process.

FIG. 18 is a sequence diagram illustrating an example of a flow of an alarm process.

The callback time monitoring section 204 of the media server 2 searches the callback time data storage section 2K2 (see FIG. 17) to detect callback time data DTC having the same callback time as the current time or a callback time exceeding the current time. In this manner, the callback time monitoring section 204 monitors whether or not the time to call back has come.

The callback alarm process section 205 finds the called party (i.e., the user who could not answer the call from the calling party before) indicated by the callback time data DTC detected by the callback time monitoring section 204 and performs a process of prompting the called party to call back the calling party.

Here, the procedure for prompting the user for a callback will be described with reference to FIG. 18.

The callback time monitoring section 204 of the media server 2 periodically (for example, every one minute) detects callback time data DTC having the same callback time as the current time or a callback time exceeding the current time.

When callback time data DTC is detected, the connection control section 201 establishes a session to and from the mobile phone terminal 3 of the called party by dialing the phone number of the called party indicated by the callback time data DTC or the like. Here, the description will be given by assuming a case where the phone number of the called party indicated by the callback time data DTC is the phone number of the user Ub and the phone number of the calling party is the phone number of the user Ua.

Each device establishes a session between the media server 2 and the mobile phone terminal 3B (#191 to #199, #291 to #295, and #791 to #794 of FIG. 18).

When the session is established, the callback alarm process section 205 transmits, to the mobile phone terminal 3B, a voice message (alarm) prompting the called party to make a return call to the calling party (#296). The message may contain the phone number of the calling party, namely, the user Ua. The mobile phone terminal 3B receives and outputs the voice message (#795).

When the message transmission is completed, each device disconnects the session (#1a1 to #1a4, #297, #298, #796, and #797).

Then, the callback time registration process section 203 transmits an instruction to the call control server 1 so as to delete the callback time data DTC from the callback time data storage section 2K2 (#299) and to delete the callback time data DTC' having the same contents as the callback time data DTC (#2a1).

When the instruction is received (#1a5), the call control server 1 deletes the callback time data DTC', which has the same contents as the callback time data DTC deleted from the callback time data storage section 2K2, from the callback time data storage section 1K2 (#1a6).

[Process in a Case where Two Parties Start Talking without Waiting for a Callback Alarm]

Figure 19:
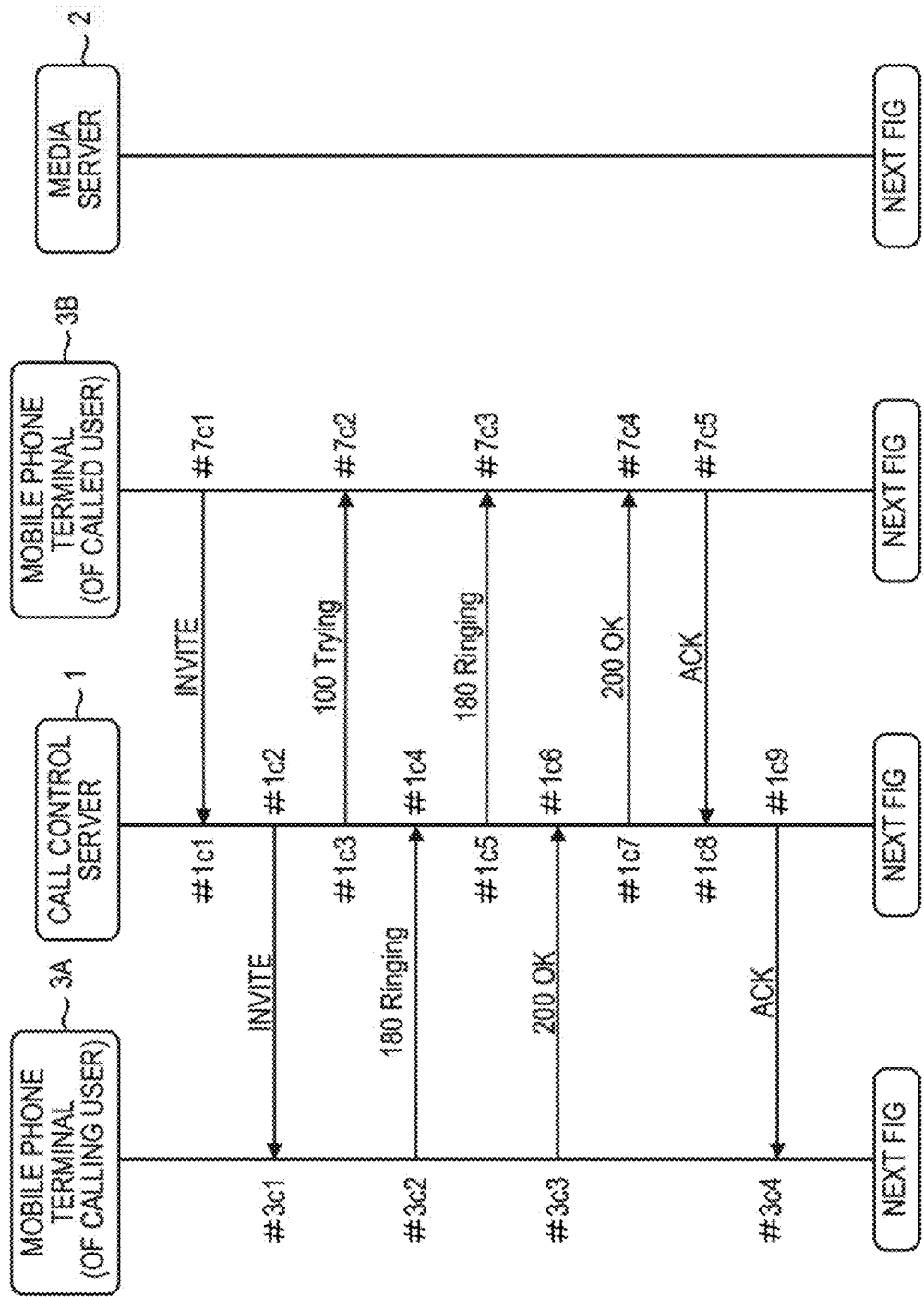
FIG. 19 is a sequence diagram illustrating an example of a flow of a process in the case where two mobile phone terminals are connected before alarmed.
Figure 20:
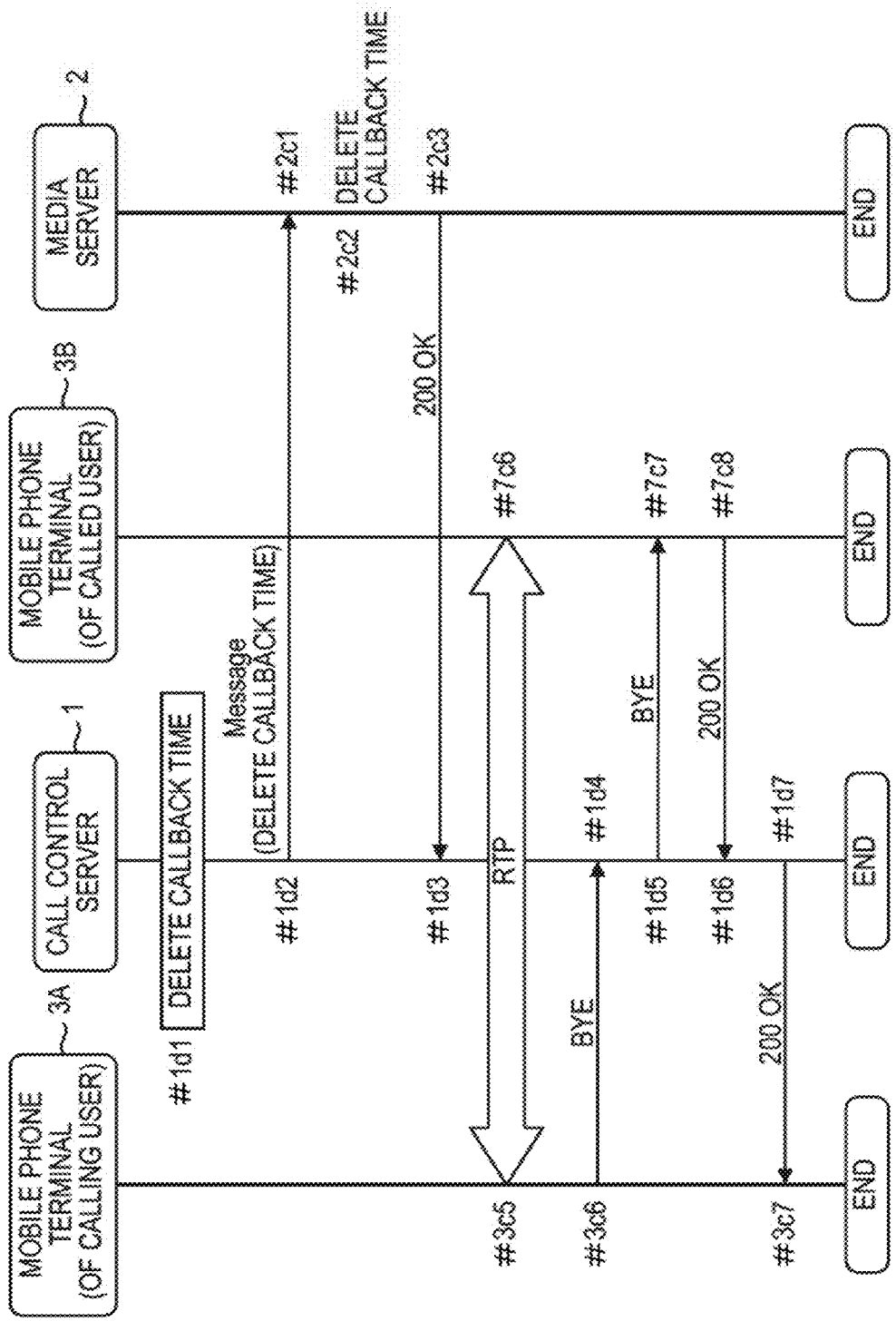
FIG. 20 is a sequence diagram illustrating an example of a flow of a process in the case where two mobile phone terminals are connected before alarmed.

FIGS. 19 and 20 are sequence diagrams illustrating an example of a flow of a process in a case where two mobile phone terminals 3 are connected before receiving an alarm.

The user (called party), who could not answer the call, may make a return call to the calling party without waiting for an alarm from the media server 2. In this case, an alarm is no longer needed. In view of this, each device performs a process of cancelling the alarm when the called party has made a return call to the calling party by the procedure illustrated in FIGS. 19 and 20.

For example, when the user Ub dials the phone number of the user Ua, each device establishes a session between the mobile phone terminal 3B and the mobile phone terminal 3A (#1c1 to #1c9, #3c1 to #3c4, and #7c1 to #7c5 of FIG. 19).

The session monitoring section 104 of the call control server 1 always monitors a session established between the mobile phone terminals.

Each time the session monitoring section 104 detects a session establishment, the time monitoring release process section 105 searches the callback time data storage section 1K2 for callback time data DTC' having the phone number of the calling party in the field "phone number of calling party"

and the phone number of the called party in the field "phone number of called party". If such callback time data DTC' is found, the time monitoring release process section 105 deletes the callback time data DTC' from the callback time data storage section 1K2 (#1*d*1), and transmits an instruction to the media server 2 so as to delete the callback time data DTC having the same contents as the callback time data DTC' (#1*d*2).

When the instruction is received from the media server 2 (#2*c*1), the time monitoring release process section 207 of the media server 2 deletes the callback time data DTC, which has the same contents as the callback time data DTC' deleted from the callback time data storage section 1K2, from the callback time data storage section 2K2 (#2*c*2). When the deletion is completed, the media server 2 transmits the OK message to the call control server 1 (#2*c*3).

When the call control server 1 receives the OK message (#1*d*3), the process of cancelling the alarm execution is completed.

During the process of cancelling the alarm execution described above, the mobile phone terminal 3A and the mobile phone terminal 3B each performs a process for communication with each other as usual (#3*c*5 and #7*c*6). When one of the mobile phone terminals 3 hangs up the phone, a process of disconnecting the session is performed (#1*d*4 to #1*d*7, #3*c*6, #3*c*7, #7*c*7, and #7*c*8).

It should be noted that if the user Ua (calling party) retries calling the user Ub (called party) and both users communicate with each other, a callback is no longer needed. In view of this, the time monitoring release process section 105 also searches for callback time data DTC' having a phone number of the calling party in the field "phone number of called party" and a phone number of the called party in the field "phone number of calling party". If such callback time data DTC' is found, each device performs the process described in FIG. 20.

[Process in a Case where the Calling Party No Longer Needs a Callback]

Figure 21:
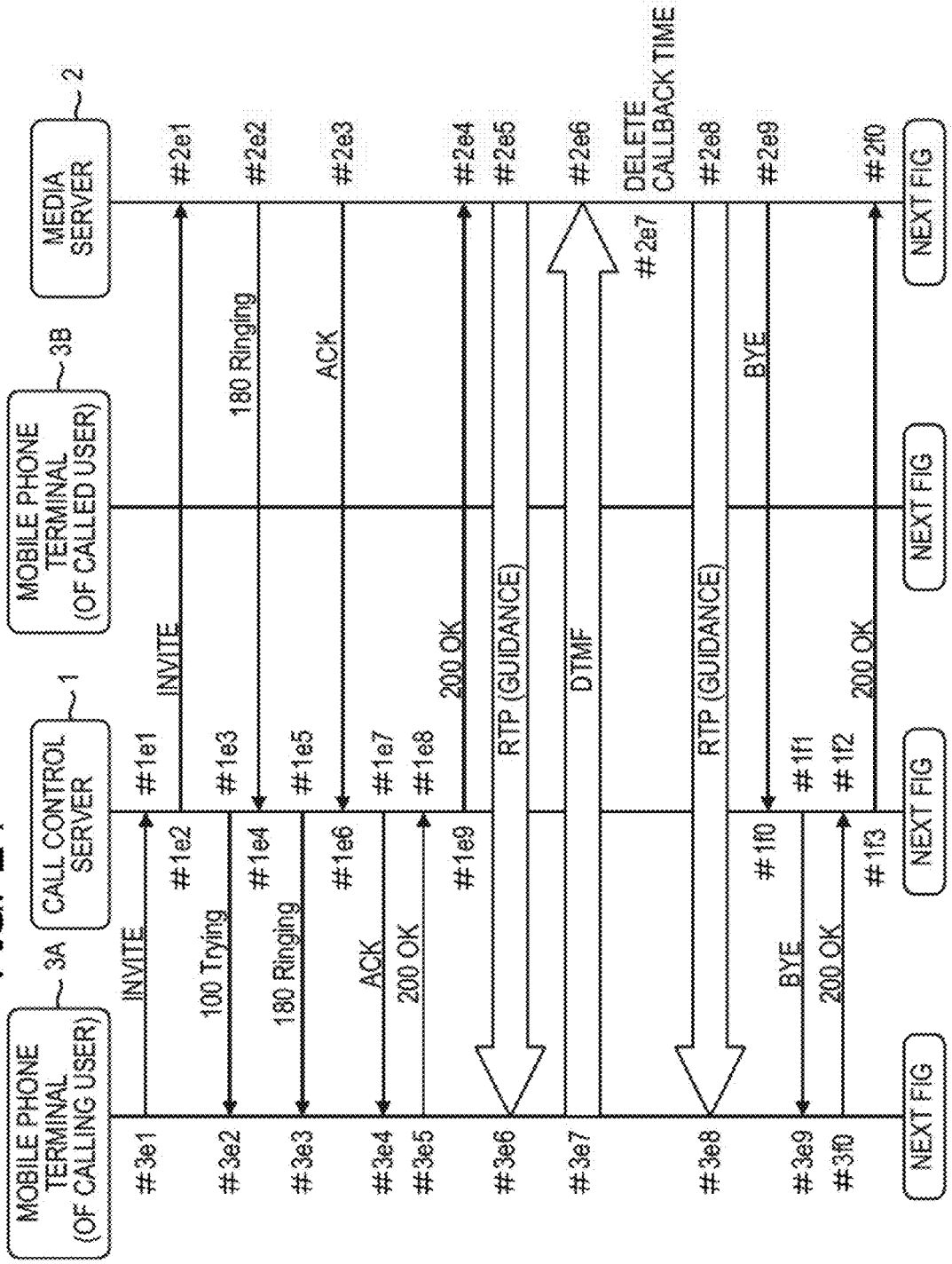
FIG. 21 is a sequence diagram illustrating an example of a flow of a process of deleting callback time data in response to a user request.
Figure 22:
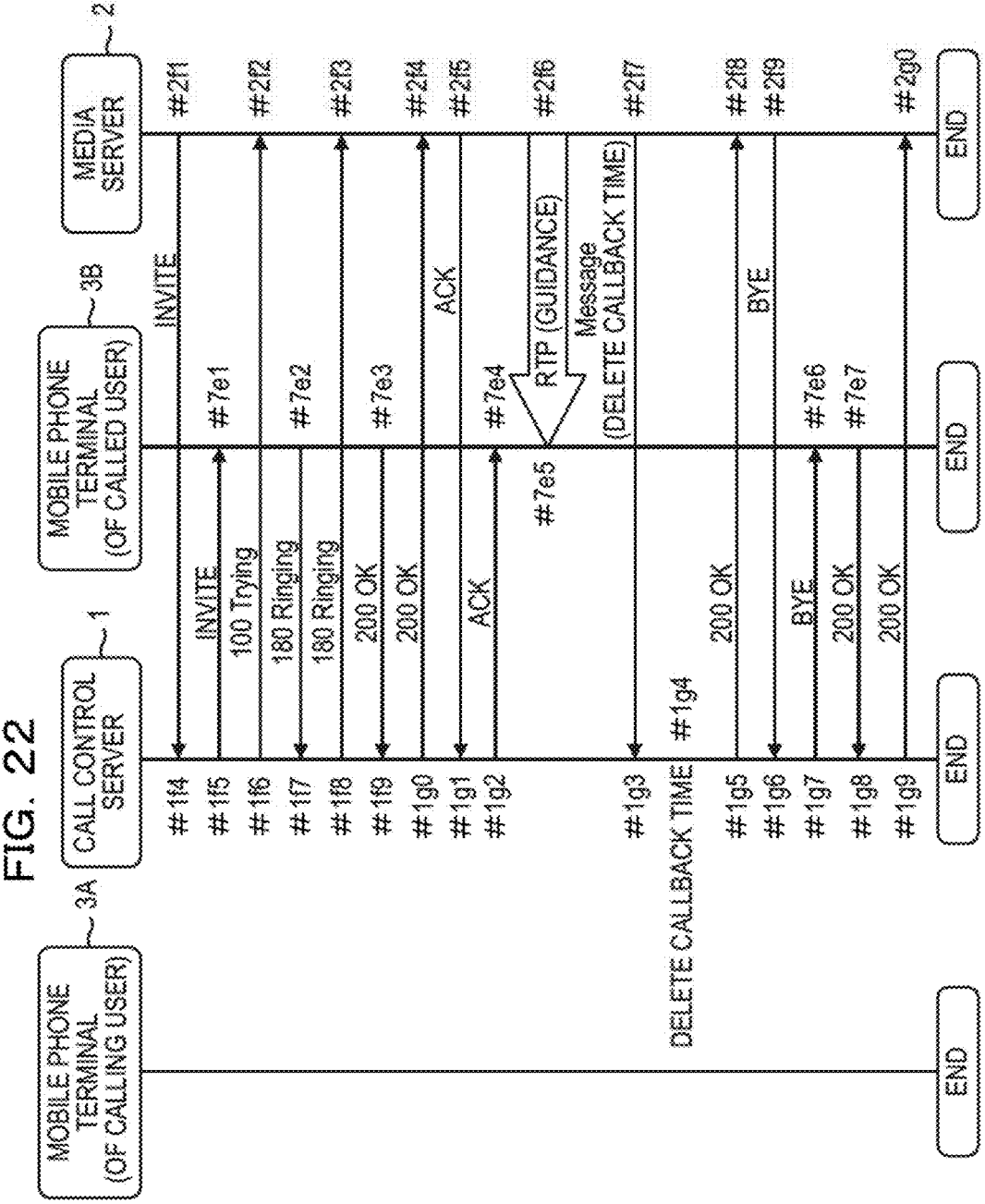
FIG. 22 is a sequence diagram illustrating an example of a flow of a process of deleting callback time data in response to a user request.

FIGS. 21 and 22 make up a sequence diagram illustrating an example of a flow of a process of deleting callback time data DTC in response to a user request.

The calling party may not need a callback from the called party. However, if the callback time data DTC and DTC' are registered in the process described above, an alarm is sent to the called party in a specific time. Therefore, there is a high possibility that the called party takes the time to make a return call.

In view of this, if a callback from the called party is not needed, the calling party may cause the callback time data DTC and DTC' to be deleted.

Here, as an example, assuming a case where the callback time data DTC and DTC' for callback of the user Ub are deleted according to an instruction from the user Ua, the process procedure of each device will be described with reference to FIGS. 21 and 22.

When the user Ua dials a specific phone number of the media server 2, the call control server 1, the media server 2, and the mobile phone terminal 3A perform a process of establishing a session between the media server 2 and the mobile phone terminal 3A (#1*e*1 to #1*e*9, #2*e*1 to #2*e*4, and #3*e*1 to #3*e*5 of FIG. 21).

When the session is established, the time monitoring release process section 207 of the media server 2 transmits, to the mobile phone terminal 3A, a voice message prompting the user Ua to enter a deletion command and the phone number of the called party (#2*e*5). For example, a voice message "Press number 1 to delete the callback alarm registration and then enter the phone number of the called party" is transmitted.

The mobile phone terminal 3A receives and outputs the voice message (#3*e*6). The user Ua presses number 1 and then enters the phone number of the user Ub. Then, the mobile phone terminal 3A transmits the signal indicating the command and the phone number to the media server 2 (#3*e*7).

When the signal is received (#2*e*6), the time monitoring release process section 207 of the media server 2 searches the callback time data storage section 2K2 for callback time data DTC having the phone number of the requester (user Ua) in the field "phone number of calling party" and the phone number indicated by the signal (phone number of the user Ub) in the field "phone number of called party" and deletes the callback time data DTC from the callback time data storage section 2K2 (see FIG. 17) (#2*e*7). Then, the media server 2 transmits the successful deletion message to the mobile phone terminal 3A (#2*e*8). The mobile phone terminal 3A receives and outputs the message (#3*e*8).

The session between the media server 2 and the mobile phone terminal 3A is disconnected (#1*f*0 to #1*f*3, #2*e*9, #2*f*0, #3*e*9, and #3*f*0 of FIG. 21), and a session between the media server 2 and the mobile phone terminal 3B is established (#1*f*4 to #1*g*2, #2*f*1 to #2*f*5, and #7*e*1 to #7*e*4 of FIG. 22).

After the session is established, the time monitoring release process section 207 transmits, to the mobile phone terminal 3B, a message indicating that the callback time data DTC has been deleted (#2*f*6). The mobile phone terminal 3B receives and outputs the message (#7*e*5).

Further, before or after or at generally the same time as the process of transmitting a message to the mobile phone terminal 3B, the time monitoring release process section 207 transmits, to the call control server 1, an instruction to delete the callback time data DTC' having the same contents as the callback time data DTC (#2*f*7).

When this instruction is received (#1*g*3), the time monitoring release process section 105 of the call control server 1 deletes the callback time data DTC', which has the same contents as the callback time data DTC deleted from the callback time data storage section 2K2, from the callback time data storage section 1K2 (#1*g*4).

When the process of transmitting the message from the media server 2 to the mobile phone terminal 3B is completed, the session between the media server 2 and the mobile phone terminal 3B is disconnected (#1*g*4 to #1*g*9, #2*f*9, #2*g*0, #7*e*6, and #7*e*7).

Figure 23:
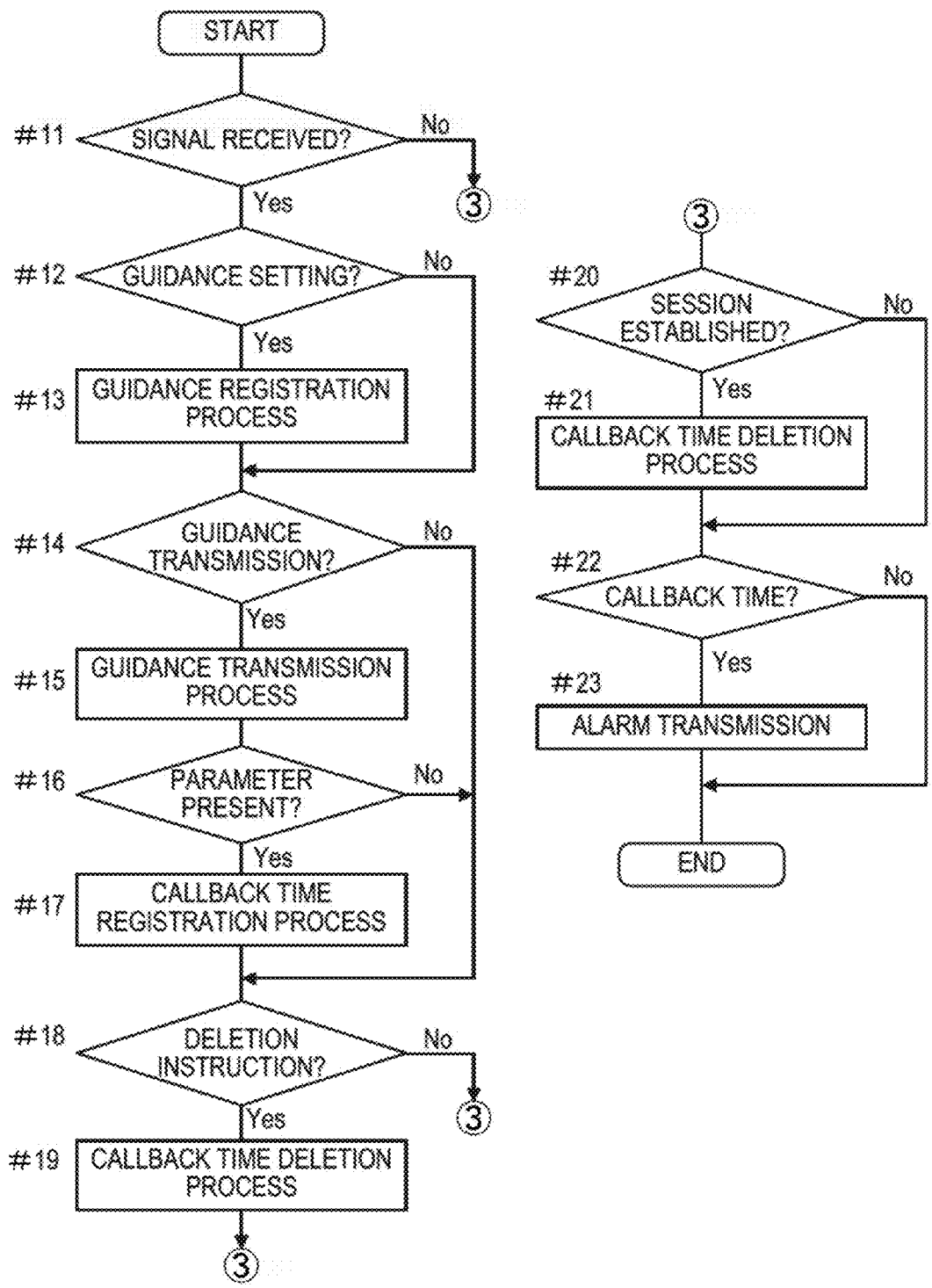
FIG. 23 is a flowchart explaining an example of an entire process flow of the media server.

FIG. 23 is a flowchart explaining an example of a process flow of the media server 2.

Hereinafter, the flow of the guidance provision process and the callback alarm process by the media server 2 will be described with reference to the flowchart of FIG. 23.

The media server 2 always waits for an input of a signal from another device. Further, the media server 2 monitors whether or not the time to call back has come based on the callback time data DTC. Each time a signal is inputted or the time to call back has come, the media server 2 performs the following processing.

When the session is established to and from the mobile phone terminal 3 and an instruction signal is received from the mobile phone terminal 3 (#11: Yes), the media server 2 performs the following processing according to the signal.

When the signal instructing guidance setting is received (#12: Yes), the media server 2 performs the guidance setting and registration process of transmitting guidance to the calling user when the called user cannot answer the call (#13). The detailed procedure for this process has been described with reference to FIGS. 6, 7, 10, and 11.

Alternatively, when a signal indicating a guidance transmission instruction and a guidance ID is received (#14: Yes), the media server 2 transmits the guidance to the mobile phone terminal 3 based on the guidance data DTB indicating the guidance ID (#15). Further, if the guidance contains the parameter X (#16: Yes), the media server 2 registers the callback time, namely, callback time data DTC (#17). The detailed procedure for the guidance transmission process and the callback time data DTC registration process has been described with reference to FIGS. 12 to 16.

Alternatively, if a signal instructing the callback registration deletion is received (#18: Yes), the media server 2 performs a process of deleting the callback time data DTC for the callback (#19). The detailed procedure for this process has been described with reference to FIGS. 21 and 22.

Alternatively, if the call control server 1 detects that the session between the two mobile phone terminals 3 is established and a signal instructing the deletion of the callback time data DTC is received from the call control server 1 (#20: Yes), the media server 2 performs a process of deleting the callback time data DTC (#21). The detailed procedure for this process has been described with reference to FIGS. 19 and 20.

When the callback time has come (#22: Yes), the media server 2 performs a process of transmitting an alarm to make the return call based on the callback time data DTC. The detailed procedure for this process has been described with reference to FIG. 18.

Second Embodiment

Figure 24:
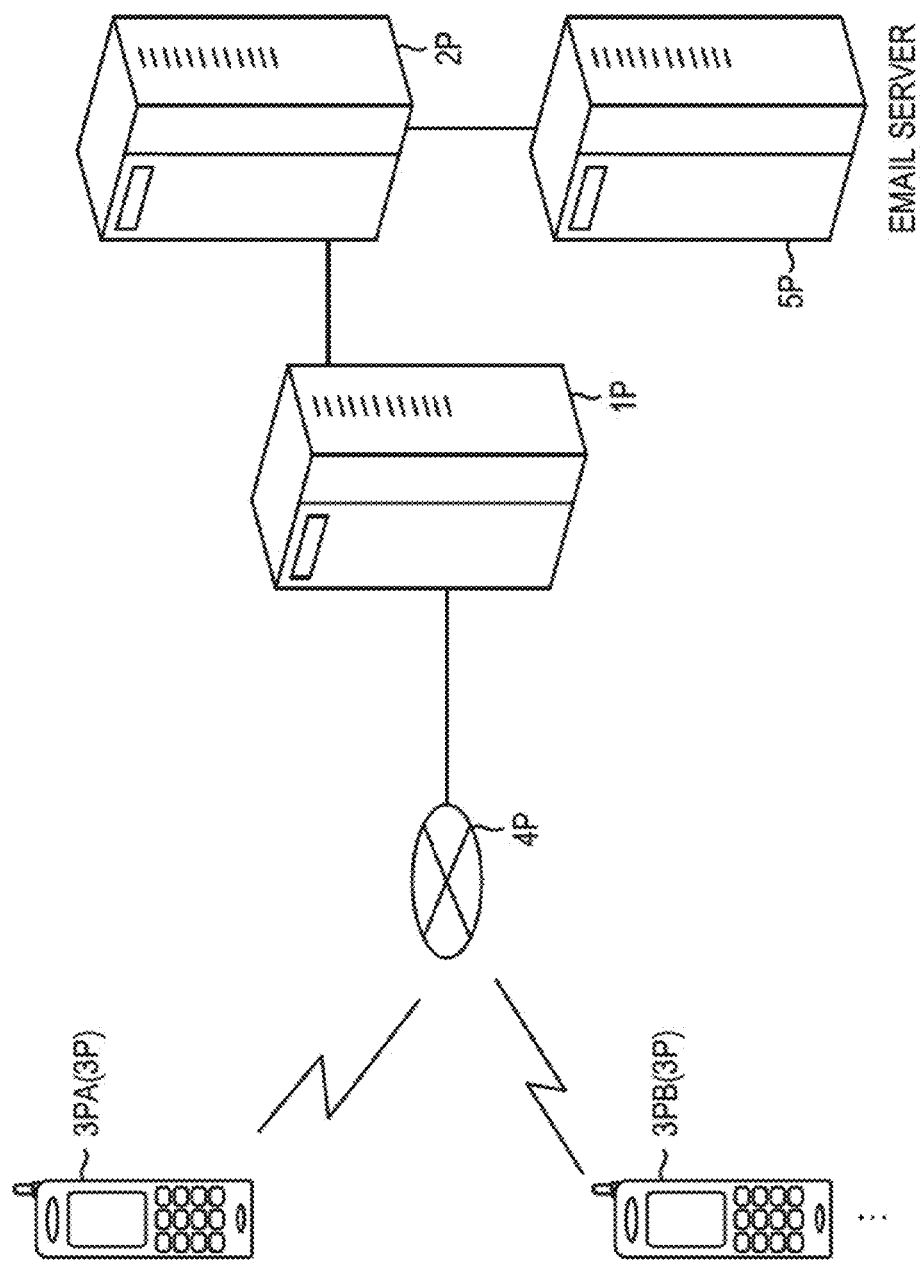
FIG. 24 illustrates an example of an entire configuration of the mobile phone communication system.
Figure 25:
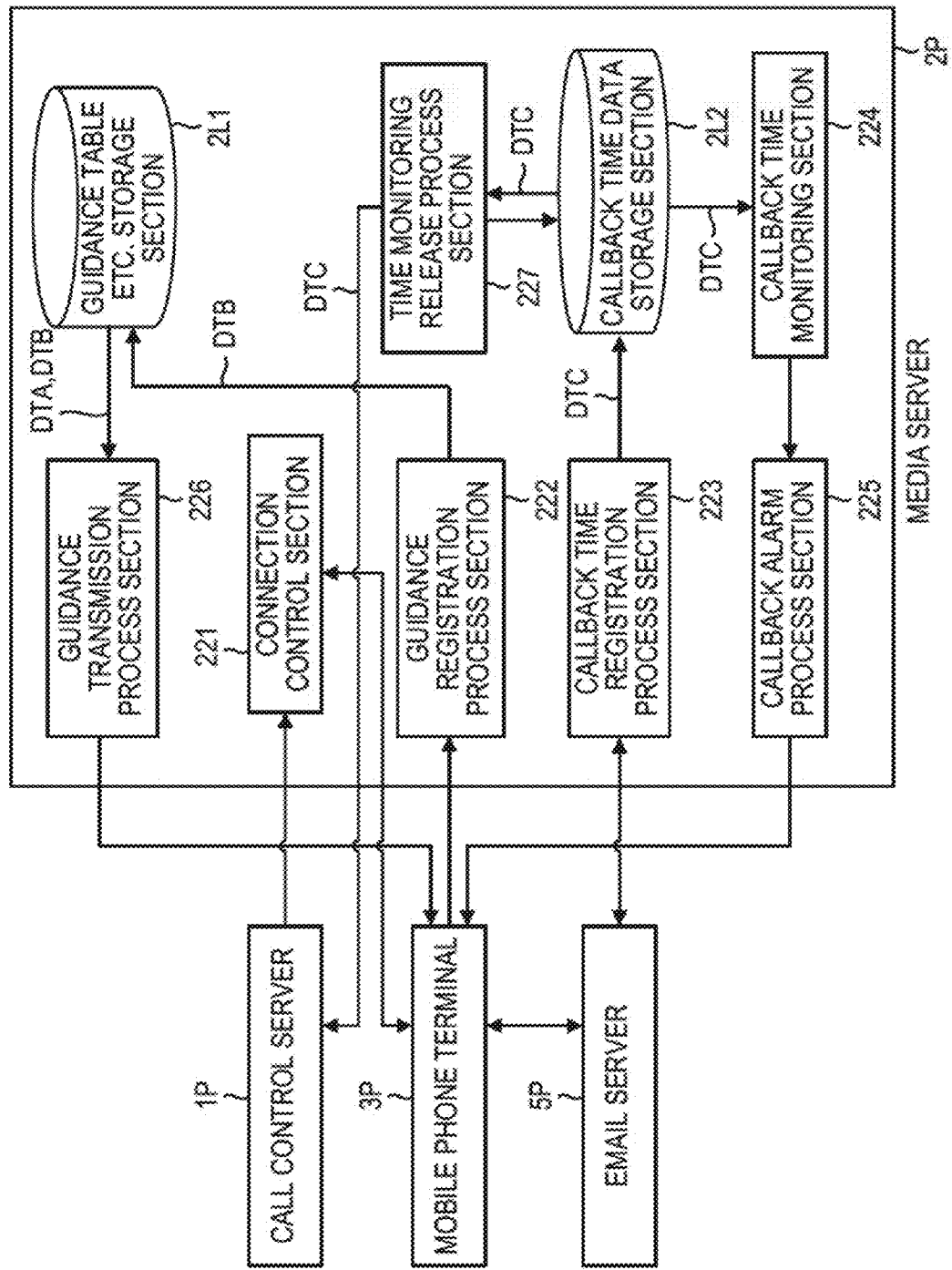
FIG. 25 illustrates an example of a functional configuration of the media server.

FIG. 24 illustrates an example of an entire configuration of the mobile phone communication system SYS2. FIG. 25 illustrates an example of a functional configuration of the media server 2P.

According to the first embodiment, if the calling party does not accept the callback time specified by the called party, a voice message to that effect is transmitted to the called party, but according to the second embodiment, an email to that effect is transmitted to the called party.

As illustrated in FIG. 24, the mobile phone communication system SYS2 in accordance with the second embodiment includes a call control server 1P, a media server 2P, a mobile phone terminal 3P, an email server 5P, a radio access network 4P, and the like.

The hardware configuration of the call control server 1P, the media server 2P, and the mobile phone terminal 3P is basically the same as that of the call control server 1, the media server 2, and the mobile phone terminal 3 in accordance with the first embodiment. However, the functional configuration of the media server 2P is different from that of the media server 2. Further, some of the processes of each device are different from those of the first embodiment.

Hereinafter, the process of each device illustrated in FIG. 24 will be described with an emphasis on the difference from the processes of the first embodiment. The description of the processes common to the first embodiment will be omitted.

As illustrated in FIG. 25, the media server 2P stores programs and data for implementing the functions such as a connection control section 221, a guidance registration process section 222, a callback time registration process section 223, a callback time monitoring section 224, a callback alarm process section 225, a guidance transmission process section 226, a time monitoring release process section 227, a guidance table etc. storage section 2L1, and a callback time data storage section 2L2. These programs and data are loaded in the RAM as needed and the programs are executed by the CPU. A part or all of these functions may be executed only by the hardware such as a dedicated circuit.

The role of each section illustrated in FIG. 25 is basically the same as the role of each section of the media server 2 illustrated in FIG. 5. However, as described above, if the calling party does not accept the callback time specified by the called party, the first embodiment and the second embodiment differ in the method of notifying the called party. For example, the callback time registration process section 223 transmits an email message instead of a voice message to the mobile phone terminal 3P of the called party.

Figure 26:
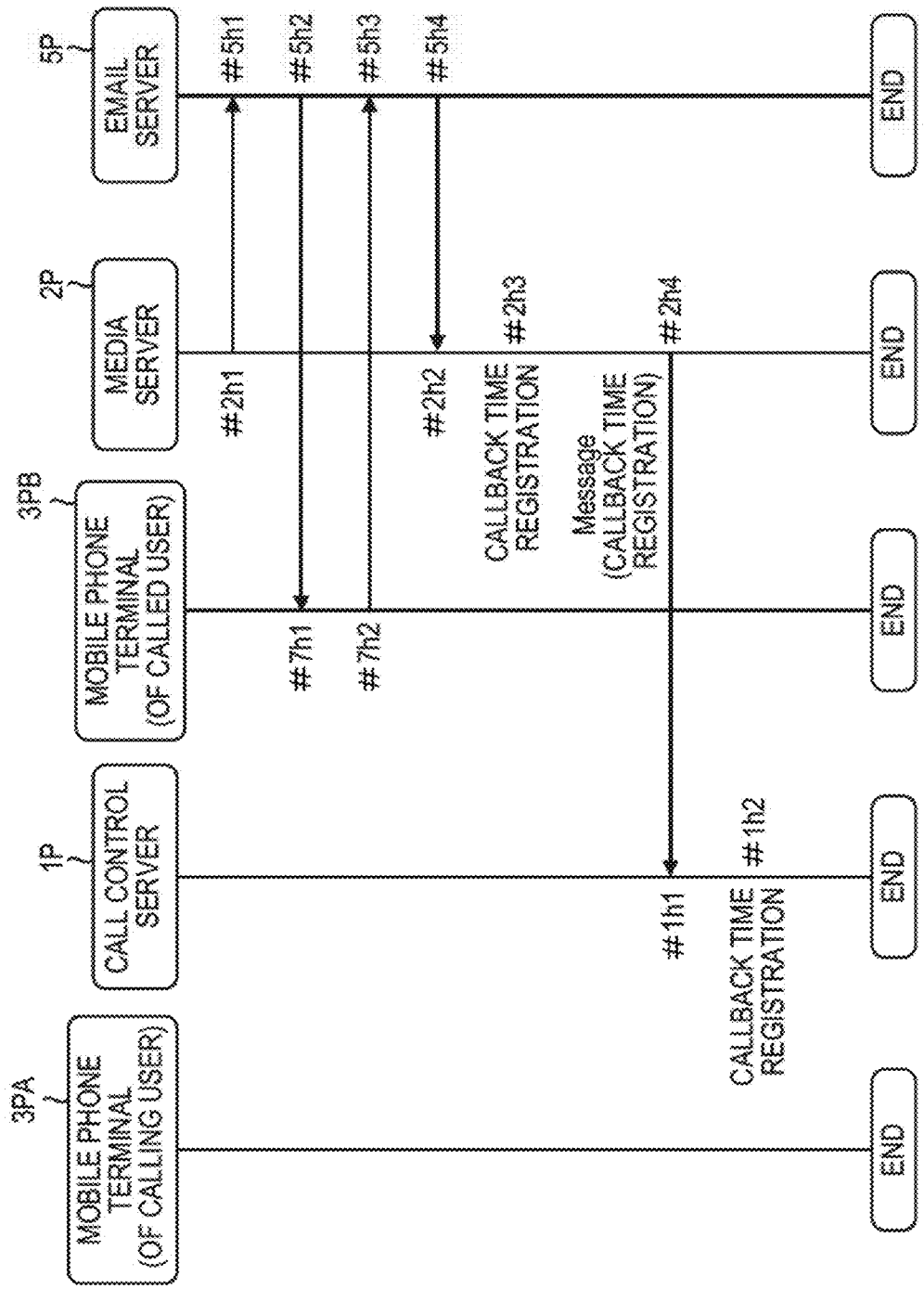
FIG. 26 is a sequence diagram illustrating changes in a second embodiment of the guidance provision process and callback time registration process explained in FIGS. 12 to 16.
Figure 27:
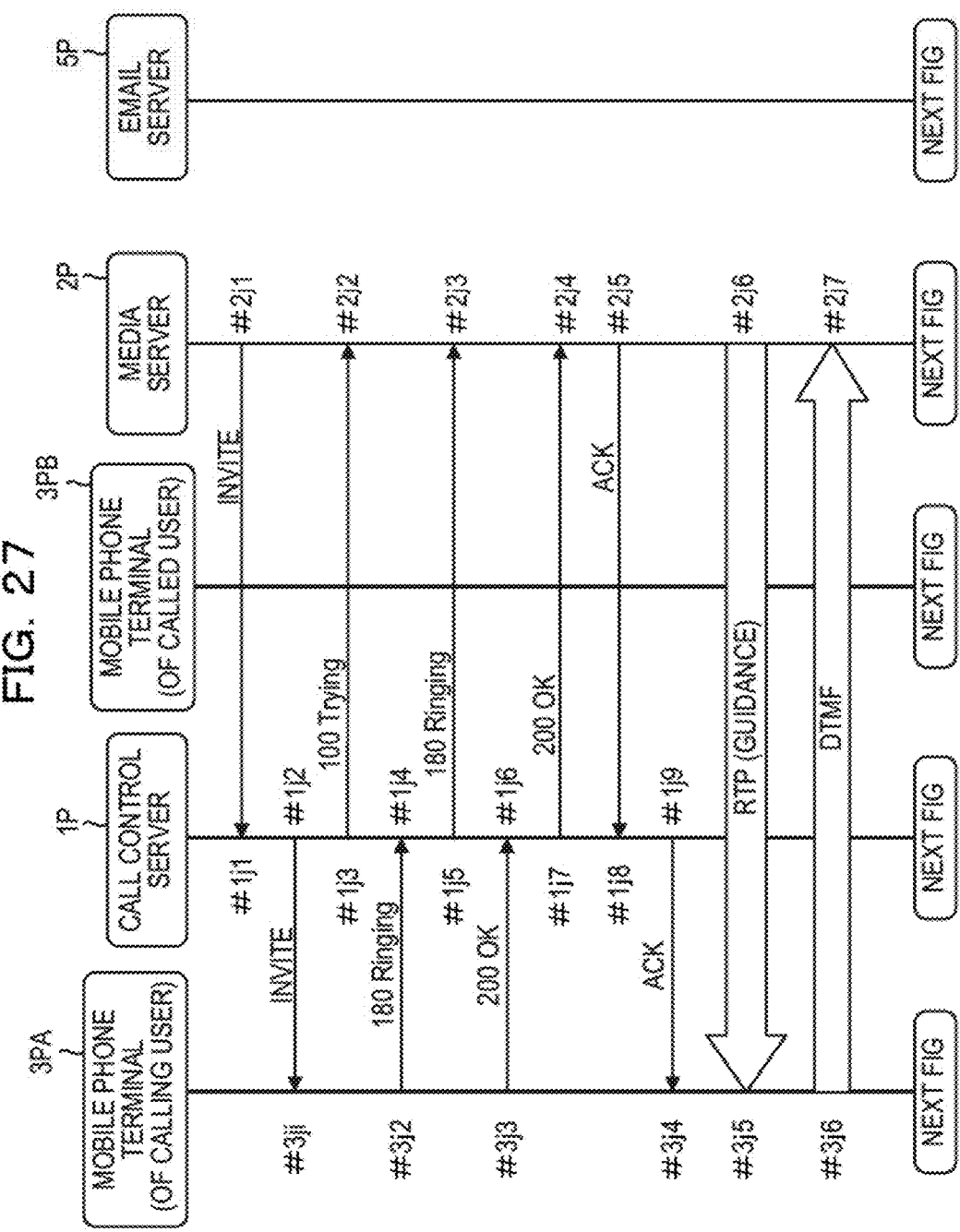
FIG. 27 is a sequence diagram illustrating changes in a second embodiment of the guidance provision process and callback time registration process explained in FIGS. 12 to 16.
Figure 28:
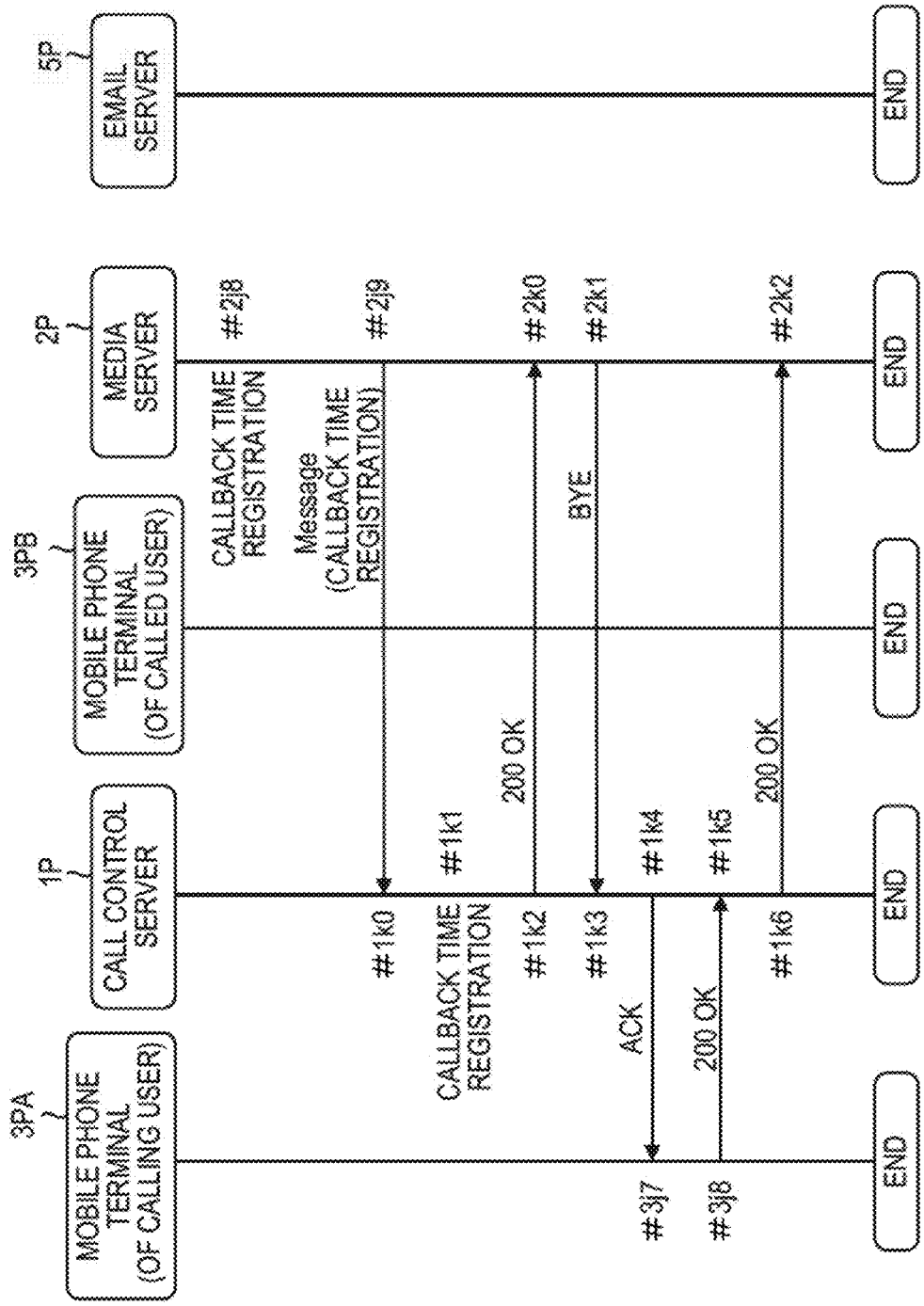
FIG. 28 is a sequence diagram illustrating changes in a second embodiment of the guidance provision process and callback time registration process explained in FIGS. 12 to 16.

FIGS. 26 to 28 are sequence diagrams illustrating changes in the second embodiment of the guidance provision process and callback time registration process explained in FIGS. 12 to 16.

Now, as an example, assuming a case where the user Ua calls the user Ub, the process of each device will be described with reference to FIGS. 26 to 28.

The user Ub needs to set guidance in advance. The process of each device and the operations of the user Ub in this case are the same as those in the first embodiment and have been described in FIGS. 6, 7, 10, and 11.

When the user Ub cannot answer a call from the user Ua, the user Ub performs an operation for transmitting guidance to the user Ua. In order to transmit guidance saying that the user Ub will call back the user Ua later, the user Ub specifies the callback time in hours from the current time. The user Ua responds whether or not to accept the specified callback time. The process of each device and the operations of the user Ua and the user Ub in this case are the same as those in the first embodiment and have been described in steps #131 to #145, #231 to #237, #331 to #338, and #731 to #734 in FIGS. 12 and 13.

The process when the user Ua accepts the specified callback time has been described in steps #146 to #152, #238 to #242, #339, and #340 in FIG. 13.

If the user Ua does not accept the specified callback time, each device prompts the user Ua to specify the user's desired time. The process in this case has been described in steps #151 to #154, #251 to #254, and #351 to #354 in FIG. 14. However, afterward, as illustrated in FIGS. 26 to 28, an email is used to transfer information to and from the user Ub.

The callback time registration process section 223 of the media server 2P generates an email message prompting the user Ub to respond whether or not to accept the callback time desired by the user Ua, and transmits the email message to the email address of the user Ub (#2h1 of FIG. 26). This email message passes through the email server 5P and reaches the mobile phone terminal 3P of the user Ub (hereinafter referred to as "mobile phone terminal 3PB") (#5h1, #5h2, and #7h1).

The user Ub reads this email, determines whether or not to accept the callback time desired (specified) by the user Ua, and writes a reply email (return mail) to that effect. For example, the user Ub writes "1" in the body text to accept the specified callback time or writes "2" in the body text to reject the specified callback time. This return mail passes through the email server 5P and reaches the media server 2P (#7h2, #5h3, #5h4, and #2h2).

If the return mail indicates "1", the callback time registration process section 223 accepts the temporarily registered callback time data DTC as the formal data to be formally registered (#2h3), and transmits the callback time data DTC to the call control server 1P (#2h4).

As in the same manner as in the first embodiment, when this callback time data DTC is received by the call control server 1P (#1h1), the callback time data DTC is registered in the callback time data storage section 1K2 as the callback time data DTC' (#1h2).

Alternatively, if the return mail indicates "2", the callback time registration process section 223 performs a retry process of prompting the user Ua to respond whether or not to accept the callback time first specified by the user Ub by way of a voice message in the same manner as in the first embodiment (#1*j*1 to #1*j*9, #2*j*1 to #2*j*7, and #3*j*1 to #3*j*6 in FIGS. 27 and 28). Note that the callback time data DTC temporarily registered in the callback time data storage section 2L2 is deleted.

When the user Ua accepts the callback time specified by the user Ub, the callback time data DTC is registered based on the callback time specified by the user Ub (#1*k*0 to #1*k*6, #2*j*8 to #2*k*2, #3*j*7, and #3*j*8).

If the user Ua does not accept the callback time specified by the user Ub again, each device performs the processes in steps #151 to #154, #251 to #254, and #351 to #354 in FIG. 14, namely, a temporary registration of the callback time data DTC based on the callback time desired by the user Ua. Further, each device performs the processes in steps #2*h*1, #2*h*2, #5*h*1 to #5*h*4, #7*h*1, and #7*h*2 in FIG. 26, namely, a process of confirming whether or not the user Ub accepts the specified callback time. If the user Ub accepts the specified callback time, each device performs a formal registration thereof (#2*h*3, #2*h*4, #1*h*1, and #1*h*2). If the user Ub does not accept the specified callback time, each device discards the temporarily registered callback time data DTC, and then performs the processes illustrated in FIGS. 27 and 28.

The process flow of the media server 2P in accordance with the second embodiment is the same as the process flow of the media server 2 in accordance with the first embodiment except the use of email as illustrated in FIG. 23.

Third Embodiment

Figure 29:
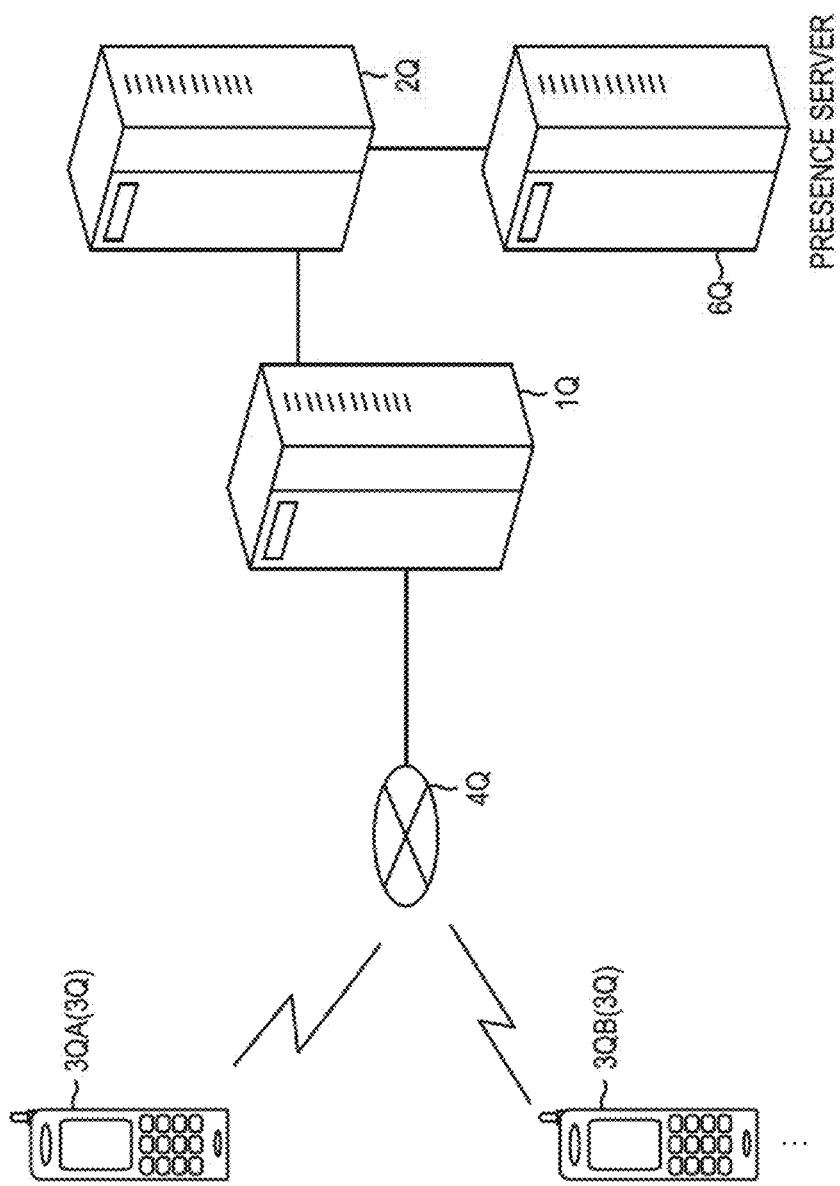
FIG. 29 illustrates an example of the mobile phone communication system.
Figure 30:
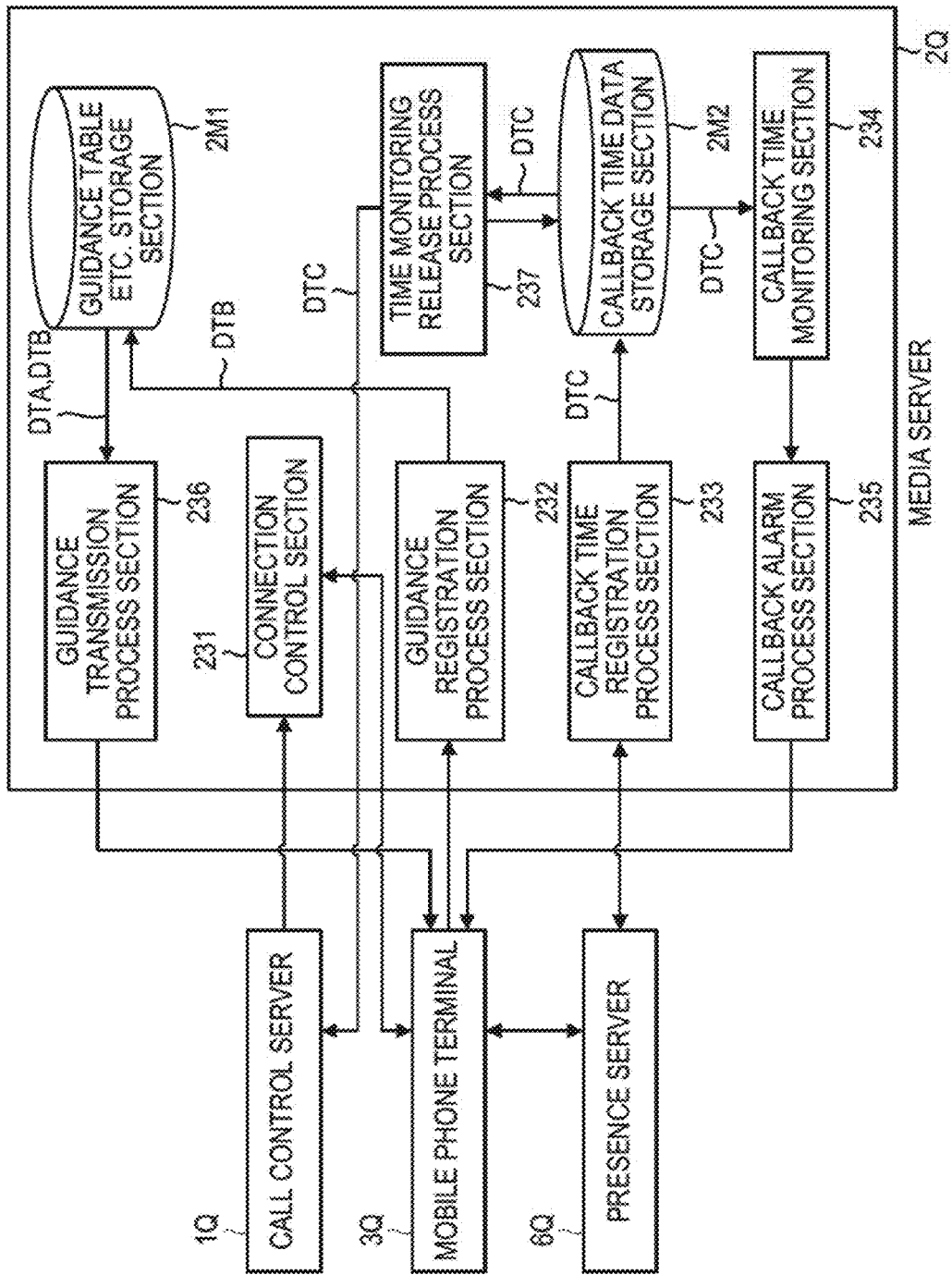
FIG. 30 illustrates an example of a functional configuration of the media server.

FIG. 29 illustrates an example of the mobile phone communication system SYS3. FIG. 30 illustrates an example of a functional configuration of the media server.

According to the second embodiment, if the calling party does not accept the callback time specified by the called party, an email to that effect is transmitted to the called party, but according to the third embodiment, an instant messenger is used instead. The instant messenger may be called "IM" or "messenger".

As illustrated in FIG. 24, the mobile phone communication system SYS3 in accordance with the third embodiment includes a call control server 1Q, a media server 2Q, a mobile phone terminal 3Q, a presence server 6Q, a radio access network 4Q, and the like.

The hardware configuration of the call control server 1Q, the media server 2Q, and the mobile phone terminal 3Q are basically the same as the call control servers 1 and 1P, the media servers 2 and 2P, and the mobile phone terminals 3 and 3P respectively. However, the functional configuration of the media server 2Q is different from that of the media servers 2 and 2P. Further, some of the processes of each device are different from those of the first embodiment and the second embodiment.

Hereinafter, the process of each device illustrated in FIG. 29 will be described with an emphasis on the difference from the processes of the first embodiment and the second embodiment. The description of the processes common to the first embodiment and the second embodiment will be omitted.

As illustrated in FIG. 30, the media server 2Q stores programs and data for implementing the functions such as a connection control section 231, a guidance registration process section 232, a callback time registration process section 233, a callback time monitoring section 234, a callback alarm process section 235, a guidance transmission process section 236, a time monitoring release process section 237, a guidance table etc. storage section 2M1, and a callback time data storage section 2M2. These programs and data are loaded in the RAM as needed and the programs are executed by the CPU. A part or all of these functions may be implemented only by hardware such as a dedicated circuit.

The role of each section illustrated in FIG. 30 is basically the same as the role of each section of the media server 2 illustrated in FIG. 5. However, as described above, if the calling party does not accept the callback time specified by the called party, the third embodiment differs from the first embodiment and the second embodiment in the method of notifying the called party. For example, the callback time registration process section 233 transmits an instant message to the mobile phone terminal 3Q of the called party.

Figure 31:
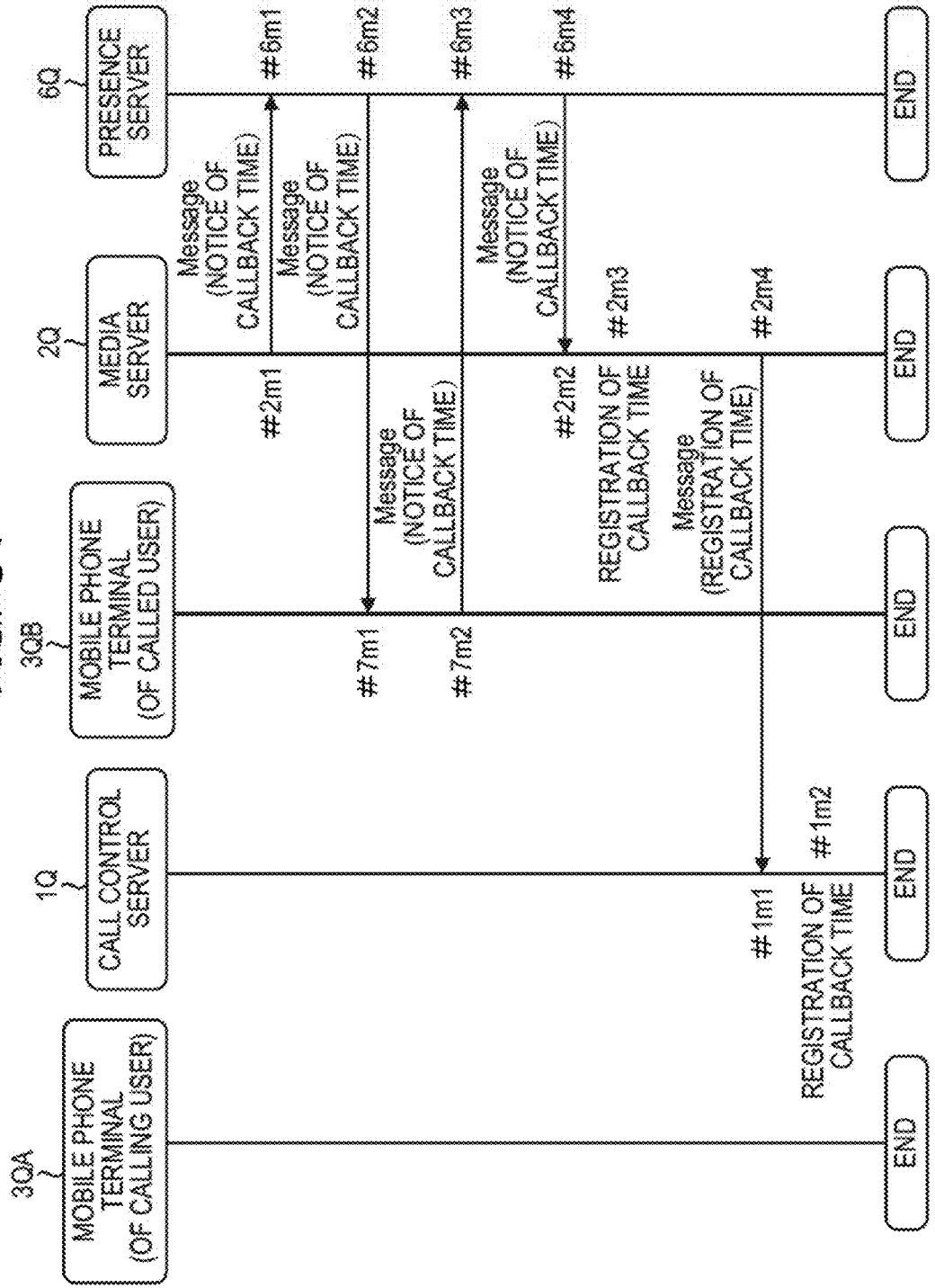
FIG. 31 is a sequence diagram illustrating changes in a third embodiment of the guidance provision process and callback time registration process explained in FIGS. 12 to 16.
Figure 32:
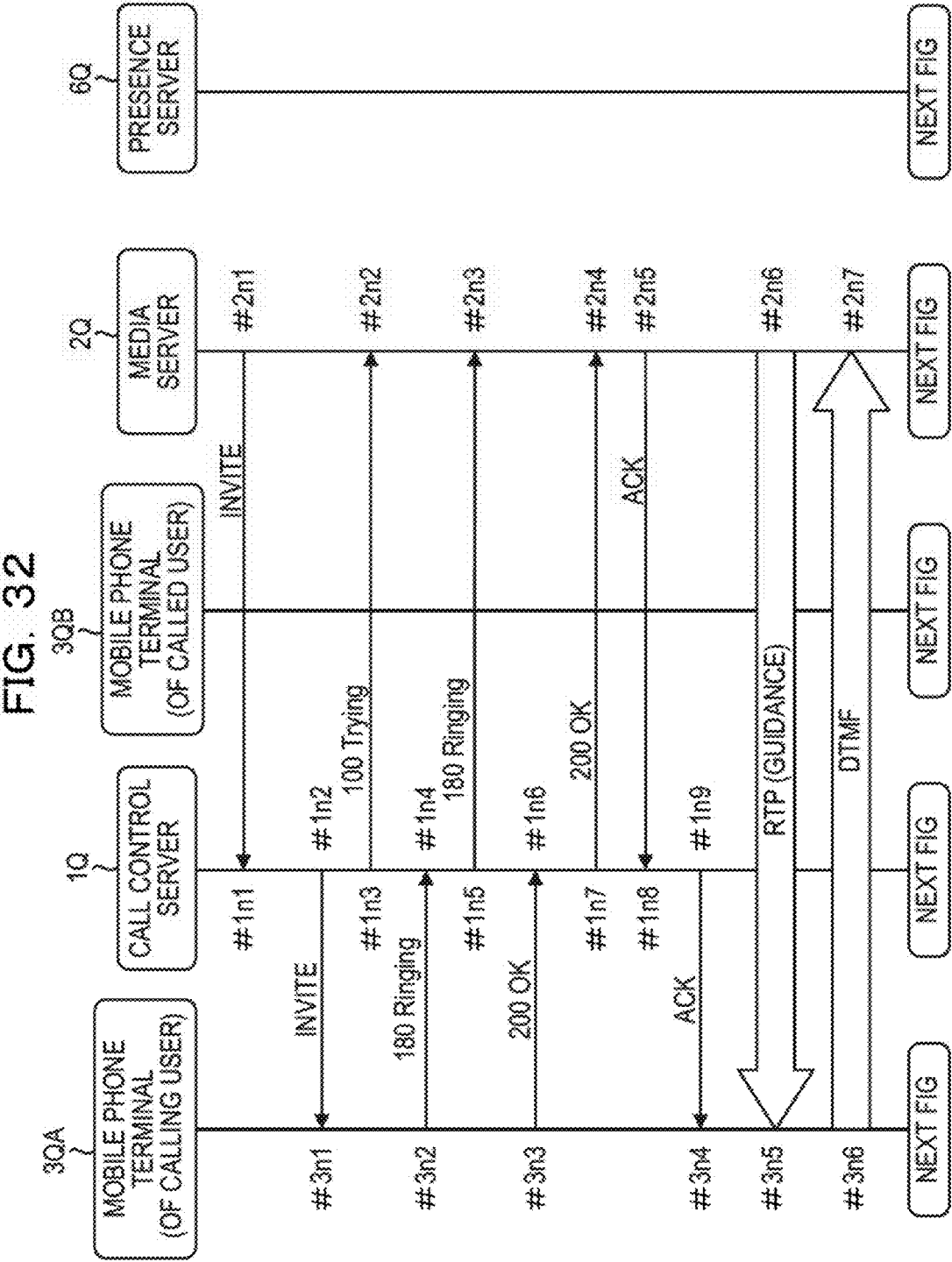
FIG. 32 is a sequence diagram illustrating changes in a third embodiment of the guidance provision process and callback time registration process explained in FIGS. 12 to 16.
Figure 33:
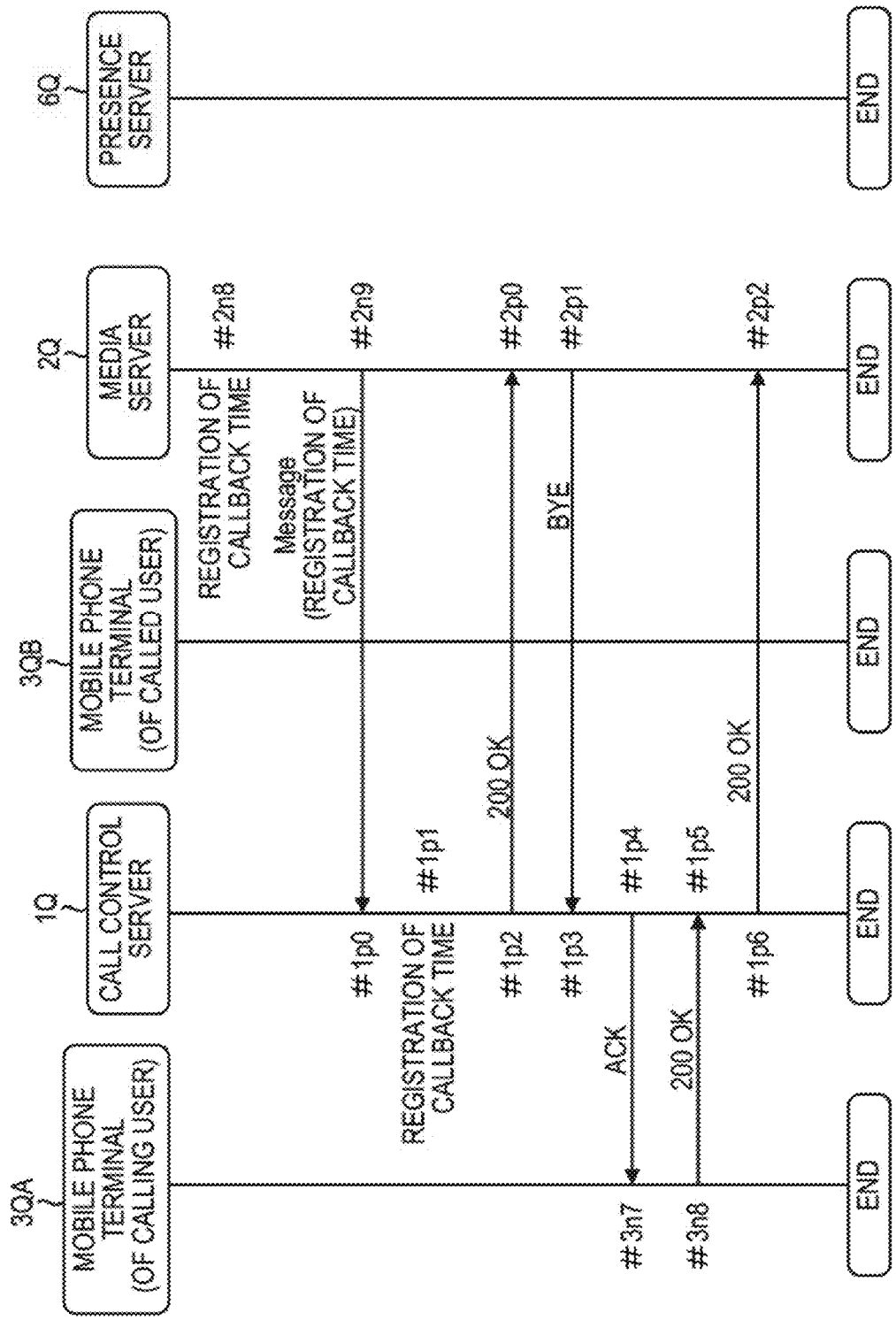
FIG. 33 is a sequence diagram illustrating changes in a third embodiment of the guidance provision process and callback time registration process explained in FIGS. 12 to 16.

FIGS. 31 to 33 are sequence diagrams illustrating changes in the third embodiment of the guidance provision process and callback time registration process explained in FIGS. 12 to 16.

Now, as an example, assuming a case where the user Ua calls the user Ub, the process of each device will be described with reference to FIGS. 31 to 33.

When the user Ub cannot answer a call from the user Ua, the user Ub performs an operation for transmitting guidance to the user Ua. In order to transmit guidance saying that the user Ub will call back the user Ua later, the user Ub specifies the callback time in hours from the current time. The user Ua responds whether or not to accept the specified callback time. The process of each device and the operations of the user Ua and the user Ub in this case are the same as those in the first embodiment and the second embodiment, and have been described in steps #131 to #145, #231 to #237, #331 to #338, and #731 to #734 in FIGS. 12 and 13.

The process in the case where the user Ua accepts the specified callback time has been described in steps #146 to #152, #238 to #242, #339, and #340 in FIG. 13.

If the user Ua does not accept the specified callback time, each device prompts the user Ua to specify the user's desired time. The process in this case has been described in steps #151 to #154, #251 to #254, and #351 to #354 in FIG. 14. However, afterward, as illustrated in FIGS. 31 to 33, an instant messenger is used to transfer information to and from the user Ub.

The callback time registration process section 233 of the media server 2Q generates an instant message prompting the user Ub to respond whether or not to accept the callback time desired by the user Ua, and transmits the instant message to the user Ub (#2*m*1 of FIG. 31). This instant message passes through the presence server 6Q and reaches the mobile phone terminal 3Q of the user Ub (hereinafter referred to as "mobile phone terminal 3QB") (#6*m*1, #6*m*2, and #7*m*1).

The user Ub reads this instant message, determines whether or not to accept the callback time desired (specified) by the user Ua, and writes a reply instant message (return message) to that effect. For example, the user Ub writes "1" in the body text to accept the specified callback time or writes "2" in the body text to reject the specified callback time. This return message passes through the presence server 6Q and reaches the media server 2Q (#7*m*2, #6*m*3, #6*m*4, and #2*m*2).

If the return message indicates "1", the callback time registration process section 233 accepts the temporarily registered callback time data DTC as the formal data to be formally registered (#2*m*3), and transmits the callback time data DTC to the call control server 1 (#2*m*4).

As in the same manner as in the first embodiment and the second embodiment, when this callback time data DTC is received by the call control server 1Q (#1*m*1), the callback time data DTC is registered in the callback time data storage section 2M2 as the callback time data DTC' (#1m2).

Alternatively, if the return message indicates "2", the callback time registration process section 233 performs a retry process of prompting the user Ua to respond whether or not to accept the callback time first specified by the user Ub by way of a voice message in the same manner as in the first embodiment and the second embodiment (#1n1 to #1n9, #2n1 to #2n7, and #3n1 to #3n6 in FIGS. 32 and 33). Note that the callback time data DTC temporarily registered in the callback time data storage section 2M2 is deleted.

When the user Ua accepts the callback time specified by the user Ub, the callback time data DTC is registered based on the callback time specified by the user Ub (#1p0 to #1p6, #2n8 to #2p2, #3n7, and #3n8).

If the user Ua does not accept the callback time specified by the user Ub again, each device performs the processes in steps #151 to #154, #251 to #254, and #351 to #354 in FIG. 14, namely, a temporary registration of the callback time data DTC based on the callback time desired by the user Ua. Further, each device performs the processes in steps #2m1, #2m2, #6m1 to #6m4, #7m1, and #7m2 in FIG. 31, namely, a process of confirming whether or not the user Ub accepts the specified callback time. If the user Ub accepts the specified callback time, each device performs a formal registration thereof (#2m3, #2m4, #1m1, and #1m2). If the user Ub does not accept the specified callback time, each device discards the temporarily registered callback time data DTC, and then performs the processes illustrated in FIGS. 32 and 33.

The process flow of the media server 2Q in accordance with the third embodiment is the same as the process flow of the media servers 2 and 2P in accordance with the first embodiment and the second embodiment respectively except the use of the instant messenger as illustrated in FIG. 23.

The first to third embodiments allow a calling party to receive a message more flexibly adapted to a circumstance of the called party. Further, the variation of guidance may be easily increased by transmitting guidance through the media server 2, 2P, or 2Q.

Moreover, when the callback time has come, an alarm is transmitted to the called party so as to prevent the called party from forgetting to make the return call. In addition, the called party may hear a callback time convenient to the calling party and decide the callback schedule, which is convenient to both the called party and the calling party.

According to the first to third embodiments, the description has been given by assuming, as an example, the case where the user uses a mobile phone terminal as the terminal device, but the present invention may be applied to the case where the user uses a PHS (Personal Handy-phone System) terminal, a personal computer having an IP phone function, or the like.

According to the first to third embodiments, the media server 2, 2P, or 2Q integratedly performs the process of managing the guidance data for each user, the process of transmitting guidance from the called party to the calling party, and the process of notifying the called party that the callback time has come, but these processes may be performed for each mobile phone terminal 3 of the called party.

In general, the presence server has a function of detecting the current circumstances for each user. In view of this, in the third embodiment, when the called party is notified that the callback time has come, configuration may be made such that the presence server 6Q detects the circumstances of the calling party (callback destination) and the media server 2Q notifies the called party of the detected circumstances. Further, if the calling party cannot answer the call (for example, the power is not turned on or the calling party is out of range), the media server 2Q may notify the called party of such circumstances. Alternatively, when the callback time has elapsed and the calling party may answer the call, an alarm may be transmitted to the called party to make the return call.

In addition, the configuration of the entire device or an individual section, the contents of the processes, the process sequence, the data configuration, and the like of the mobile phone communication systems SYS, SYS2, and SYS3, the call control servers 1, 1P, and 1Q, and the media servers 2, 2p, and 2Q may be modified as needed without departing from the spirit of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A message transmission method comprising:
    storing, in a storage, message data including a plurality of voice message content, each voice message content being associated with content information;
    acquiring the content information based on an operation of a called party when a second terminal device receives a call from a first terminal device;
    determining content of a first voice message that guides a user of the first terminal device by voice, based on the acquired content information; and
    transmitting, on a real-time basis, to the first terminal device, the determined content of the first voice message so as to guide the user of the first terminal device by voice.

2. The message transmission method according to claim 1, wherein the second terminal device transmits the content information to a server, and
    the server determines the content of a voice message for guiding a user of the first and second terminal devices by voice, based on the acquired content information.

3. The message transmission method according to claim 1, wherein the content information includes an interval of time from when the called party received the call until the called party is scheduled to make a return call, the method further comprising notifying the second terminal device of making the return call at a scheduled time, by transmitting, on a real-time basis, a second voice message including information on the scheduled time to the second terminal device so as to guide a user of the second terminal device by voice.

4. The message transmission method according to claim 1, wherein the content information includes an interval of time from when the called party received the call until the called party is scheduled to make a return call,
    the method further comprising:
    notifying the first terminal device of the scheduled time; and
    specifying a desired callback time as desired by the calling party, who is the user of the first terminal device,
    wherein, when the calling party specifies the desired time, notifying the second terminal device of making the return call at the desired callback time; and when the calling party does not specify the desired time, notifying the second terminal device of making the return call at the scheduled time.

5. A message transmission system comprising:
a storage storing message data including a plurality of voice message content, each voice message content being associated with content information;
a communication interface circuit receiving the content information based on an operation of a called party when a second terminal device receives a call from a first terminal device;
a guidance transmission processor determining content of a voice message that guides a user of the first terminal device by voice, based on the received content information and message data and transmitting, on a real-time basis, the determined content of the voice message to the first terminal device so as to guide the user of the first terminal device by voice.

\* \* \* \* \*